United States Patent
Demyanov et al.

(10) Patent No.: US 11,900,565 B2
(45) Date of Patent: *Feb. 13, 2024

(54) DEEP FEATURE GENERATIVE ADVERSARIAL NEURAL NETWORKS

(71) Applicant: Snap Inc., Santa Monica, CA (US)

(72) Inventors: Sergey Demyanov, Santa Monica, CA (US); Aleksei Podkin, Santa Monica, CA (US); Aleksei Stoliar, Marina del Rey, CA (US); Vadim Velicodnii, London (GB); Fedor Zhdanov, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/116,682

(22) Filed: Mar. 2, 2023

(65) Prior Publication Data

US 2023/0206398 A1 Jun. 29, 2023

Related U.S. Application Data

(63) Continuation of application No. 17/445,362, filed on Aug. 18, 2021, now Pat. No. 11,657,479, which is a continuation of application No. 16/376,564, filed on Apr. 5, 2019, now Pat. No. 11,120,526.

(51) Int. Cl.
*G06T 5/00* (2006.01)
*G06T 5/10* (2006.01)
*H04L 51/10* (2022.01)

(52) U.S. Cl.
CPC ............... *G06T 5/001* (2013.01); *G06T 5/10* (2013.01); *G06T 2200/16* (2013.01); *G06T 2207/10004* (2013.01); *G06T 2207/20048* (2013.01); *G06T 2207/20081* (2013.01); *G06T 2207/30196* (2013.01); *H04L 51/10* (2013.01)

(58) Field of Classification Search
None
See application file for complete search history.

(56) References Cited

U.S. PATENT DOCUMENTS

| | | | |
|---|---|---|---|
| 10,389,676 B2* | 8/2019 | Rubinstein | G06F 3/04847 |
| 11,120,526 B1* | 9/2021 | Demyanov | G06T 5/10 |
| 11,205,086 B2* | 12/2021 | Sriram | G06V 10/82 |
| 11,657,479 B2 | 5/2023 | Demyanov et al. | |
| 2013/0163854 A1 | 6/2013 | Cheng | |

(Continued)

OTHER PUBLICATIONS

Symbolic Music Genre Transfer with CycleGAN. Brunner et al . . . (Year: 2018).*

(Continued)

*Primary Examiner* — Delomia L Gilliard
(74) *Attorney, Agent, or Firm* — Schwegman Lundberg & Woessner, P.A.

(57) ABSTRACT

A data item is identified on a device. A neural network that includes an adversarial transformation subnetwork is applied to the data item to generate a modified data item. Output indicative of the modified data item is caused to be presented on the device. The neural network further comprises an encoder and a decoder. The neural network is trained in at least two stages. At least one of the encoder and the decoder is trained in a first stage and the adversarial transformation subnetwork is trained in a second stage.

20 Claims, 15 Drawing Sheets

(56) References Cited

U.S. PATENT DOCUMENTS

| | | |
|---|---|---|
| 2018/0075581 A1 | 3/2018 | Shi et al. |
| 2018/0174052 A1 | 6/2018 | Rippel et al. |
| 2018/0176576 A1* | 6/2018 | Rippel ............... G06V 20/52 |
| 2018/0293712 A1 | 10/2018 | Vogels et al. |
| 2018/0308243 A1* | 10/2018 | Justice ............ G08B 13/19608 |
| 2018/0314716 A1* | 11/2018 | Kim ..................... G06T 1/20 |
| 2018/0373979 A1 | 12/2018 | Wang et al. |
| 2019/0087660 A1* | 3/2019 | Hare ..................... G06T 7/248 |
| 2019/0171929 A1* | 6/2019 | Abadi ................ G06N 3/045 |
| 2019/0180136 A1 | 6/2019 | Bousmalis et al. |
| 2019/0258878 A1* | 8/2019 | Koivisto ............. G01S 7/417 |
| 2019/0304065 A1* | 10/2019 | Bousmalis ........ G06N 20/10 |
| 2019/0318261 A1 | 10/2019 | Deng et al. |
| 2019/0379630 A1* | 12/2019 | Rubinstein ......... G06Q 50/01 |
| 2019/0392624 A1* | 12/2019 | Elgammal ......... G06N 3/045 |
| 2020/0053034 A1 | 2/2020 | Kozhemiak et al. |
| 2020/0112531 A1 | 4/2020 | Tang |
| 2020/0160113 A1 | 5/2020 | Zhang et al. |
| 2020/0193717 A1* | 6/2020 | Daly .................. G06N 3/045 |
| 2020/0257985 A1 | 8/2020 | West et al. |
| 2021/0383509 A1 | 12/2021 | Demyanov et al. |
| 2022/0101635 A1* | 3/2022 | Koivisto ............ G06N 3/084 |

OTHER PUBLICATIONS

"U.S. Appl. No. 16/376,564, Non Final Office Action dated Oct. 6, 2020", 13 pgs.

"U.S. Appl. No. 16/376,564, Notice of Allowance dated May 12, 2021", 8 pgs.

"U.S. Appl. No. 16/376,564, Response filed Feb. 8, 2021 to Non Final Office Action dated Oct. 6, 2020", 9 pgs.

"U.S. Appl. No. 17/445,362, Non Final Office Action dated Sep. 21, 2022", 16 pgs.

"U.S. Appl. No. 17/445,362, Notice of Allowance dated Jan. 17, 2023", 8 pgs.

Chen, Ying-Cong, et al., "Facelet-Bank for Fast Portrait Manipulation", arXiv:1803.05576v3 [cs.CV], (Mar. 30, 2018), 9 pgs.

Upchurch, Paul, et al., "Deep Feature Interpolation for Image Content Changes", arXiv:1611.05507v2 [cs.CV], (Jun. 19, 2017), 10 pgs.

* cited by examiner

DEEP FEATURE GENERATIVE ADVERSARIAL NEURAL NETWORKS

CLAIM OF PRIORITY

This application is a continuation of U.S. patent application Ser. No. 17/445,362, filed Aug. 18, 2021, which is a continuation of U.S. patent application Ser. No. 16/376,564, filed Apr. 5, 2019, which applications are incorporated herein by reference in their entireties.

TECHNICAL FIELD

The present disclosure generally relates to machines configured to the technical field of special-purpose machines that manage electronic image processing and improvements to such variants, and to the technologies by which such special-purpose machines become improved compared to other special-purpose machines for performing data transformations using neural networks.

BACKGROUND

Machine learning schemes enable computers to perform image manipulation processes. However, many image manipulation techniques are complex and have large computational requirements, which make them ill-suited for implementation on mobile devices, such as smartphones.

BRIEF DESCRIPTION OF THE DRAWINGS

To easily identify the discussion of any particular element or act, the most significant digit or digits in a reference number refer to the figure ("FIG.") number in which that element or act is first introduced.

DETAILED DESCRIPTION

Figure 1:
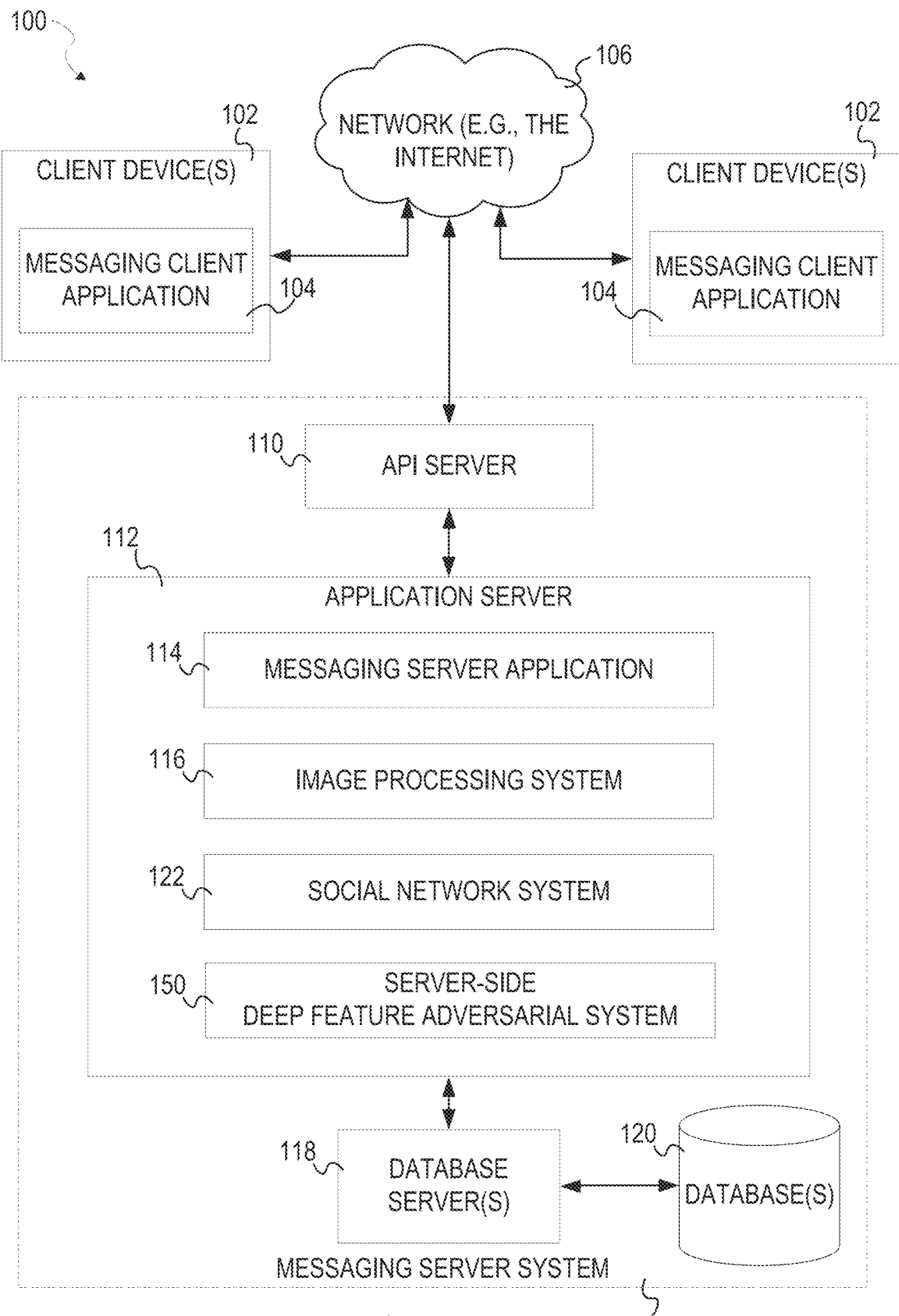
FIG. 1 is a block diagram showing an example messaging system for exchanging data (e.g., messages and associated content) over a network.

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

As discussed, some image manipulation techniques are computationally complex and ill-suited for implementation on low-resource computers, such as a mobile device with limited memory and processing power. An example of a complex image manipulation technique includes neural network-based image domain transfer in which a convolutional neural network is trained to transfer an image from its native domain (e.g., appearance) a target domain. For instance, an image domain transfer neural network can be trained to transfer a camera image of a day time scene into a nighttime scene, or transfer an image of a young person to an older version of the same person. Image domain transfer neural networks can be trained on large sets of example image data (e.g., thousands of images of a given target domain, thousands of images of night time scene, thousands of images of older people, thousands of images of smiling people, etc.), and during training the neural network uses the multiple images in the large set to train and capture details exhibited in the example training images. While image domain transfer neural networks can yield impressive results, implementing such schemes on a mobile device (e.g., a smartphone) is not practical because the processing time would be very long and result in poor user experience. Further, applying such schemes in live video (e.g., applying an effect to each frame of a video) on the mobile device in real time is even more impractical. Some conventional approaches rely on sending the images to a server for complex image processing, and then displaying the result on the client device. However, relying on server support requires network connections which may not be available.

To this end, a deep-feature adversarial system can implement complex image manipulation schemes, such as neural network-based domain transfer, on user devices using an adversarially trained transformation subnetwork that operates between encoder and decoder layers. In the below example embodiments, the domain transfer technique discussed is that of user facial feature-based domain transfer in which an image of a user's face is modified to apply a different expression (e.g., from a frown expression to a smile expression) or appearance (e.g., from a youthful appearance to an elderly appearance). One of ordinary skill in the art appreciates that additional complex data manipulation schemes other than image domain transfer may likewise be implemented. For example, the deep-feature adversarial system can be trained to transfer a sound recording from an initial domain to a domain of a certain music genre or style (e.g., Salsa music), as discussed in further detail below. Further, it is appreciated that each network can be a sub-network or layer of a larger network that comprises a plurality of layers. For example, a domain transfer neural network can comprise a generator and a discriminator, each of which can be referred to as a layer (e.g., generator layer, discriminator layer), subnetwork (e.g., generator subnet, discriminator subnet), and so forth, and the entire network may be trained using end-to-end schemes, such as back propagation.

Unlike some conventional approaches, the deep-feature adversarial system is trained in two stages: a first generator training stage and a second transformation training stage. In the first stage, a generator comprising an encoder network followed by a decoder network is trained. In some example embodiments, the generator network is trained separately (e.g., encoder network first, decoder network last), or jointly (e.g., encoder and decoder networks trained at the same time using the same loss function).

At a high level, the encoder is trained to transform raw object features (e.g. pixels of images) to middle-level and high-level feature representations that describe the whole input object or large parts of it in deep-feature space, whereas the decoder network is trained to reconstruct the original input object from the middle-level or high-level feature representations generated by the encoder.

In the second stage, a transformation subnetwork is trained to apply a transformation effect to input data (e.g., data generated by the encoder layer), according to some example embodiments. The subnet is adversarially trained using a discrimination network that is separated from the transformation subnetwork by the decoder network, according to some example embodiments. The encoder-decoder networks are fixed in the second stage in that they are already trained, and only the transformation subnetwork is trained in the second stage.

Adversarial training involves a generator network that generates a sample and a discriminator network that estimates the probability that the sample came from training data set of the target domain rather than the generator network. In other words, the discriminator network tries to differentiate between real data of the target subdomain (e.g., a night time scene, older person appearance, Salsa style music) and transformed images generated by the generator network. In some example embodiments, the generator network and the discriminator network are trained at the same time via end-to-end back propagation in which the generator network tries to make the error of the discriminator network as high as possible, thereby improving the generator network output data in mimicking real objects from the target domain.

In some example embodiments, adversarial training is only performed in the second stage to train the transformation subnetwork using the pretrained encoder and decoder networks. This prevents the transformer subnetwork from generating adversarial examples for the discriminator network, which are confidently classified by the discriminator network as real with high confidence, but in fact contain significant artifacts that would be noticeable by a human observer. Accordingly, by performing adversarial training after the generator network is fixed, the deep-feature adversarial system can generate high quality results that accurately simulate domain appearance features of the target domain without noticeable artifacts.

In some example embodiments, the pretraining of the generator in the first stage further allows the deep-feature adversarial system to not use optimized loss function data that would keep transformed objects similar to the original input objects, e.g. such as cycle loss. Further, in some example embodiments, second stage training does not proceed further than necessary to obtain a high misclassification score on the discriminator. In this way, the produced results have a stronger effect than those of past approaches, while still preserving the collateral features that are not relevant to the differences between the source domain (e.g., an image in its native style, a day time scene) and a target domain (e.g., a night time scene). Collateral features are generally those that may be significant to complete the image or recording, but are generally not modified to transfer between domains. For example, if transferring an image of a youthful person to the appearance of an older person, the eye color may be a collateral feature since it may not change over time, whereas skin texture, wrinkle quantity, and other features may be modified to generate a high-quality image result with strong older person visual attributes.

FIG. 1 shows a block diagram of an example messaging system 100 for exchanging data (e.g., social media posts created using the modified image sequence) over a network 106. The messaging system 100 includes multiple client devices 102, each of which hosts a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video, or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality within either the messaging client application 104 or the messaging server system 108 is a design choice. For example, it may be technically preferable to initially deploy certain technology and functionality within the messaging server system 108, and to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. This data may include message content, client device information, geolocation information, media annotation and overlays, message content persistence conditions, social network information, and live event information, as examples. Data exchanges within the messaging system 100 are invoked and controlled through functions available via user interfaces (UIs) of the messaging client application 104.

Turning now specifically to the messaging server system 108, an application programming interface (API) server 110 is coupled to, and provides a programmatic interface to, an application server 112. The application server 112 is communicatively coupled to a database server 118, which facilitates access to a database 120 in which is stored data associated with messages processed by the application server 112.

The API server 110 receives and transmits message data (e.g., commands and message payloads) between the client devices 102 and the application server 112. Specifically, the API server 110 provides a set of interfaces (e.g., routines and protocols) that can be called or queried by the messaging client application 104 in order to invoke functionality of the application server 112. The API server 110 exposes various functions supported by the application server 112, including account registration; login functionality; the sending of messages, via the application server 112, from a particular messaging client application 104 to another messaging client application 104; the sending of media files (e.g., images or video) from a messaging client application 104 to a messaging server application 114 for possible access by another messaging client application 104; the setting of a collection of media data (e.g., a story); the retrieval of such collections; the retrieval of a list of friends of a user of a client device 102; the retrieval of messages and content; the adding and deletion of friends to and from a social graph; the location of friends within the social graph; and opening application events (e.g., relating to the messaging client application 104).

The application server 112 hosts a number of applications and subsystems, including the messaging server application 114, an image processing system 116, a social network system 122, and a server-side deep-feature adversarial system 150. The messaging server application 114 implements a number of message-processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor- and memory-intensive processing of data may also be performed server-side by the messaging server application 114, in view of the hardware requirements for such processing.

The application server 112 also includes the image processing system 116, which is dedicated to performing various image processing operations, typically with respect to images or video received within the payload of a message at the messaging server application 114.

The social network system 122 supports various social networking functions and services, and makes these functions and services available to the messaging server application 114. To this end, the social network system 122 maintains and accesses an entity graph (e.g., entity graph 304 in FIG. 3) within the database 120. Examples of functions and services supported by the social network system 122 include the identification of other users of the messaging system 100 with whom a particular user has relationships or whom the particular user is "following," and also the identification of other entities and interests of a particular user.

The server-side deep-feature adversarial system 150 is a server-side instance that is configured to perform training of neural network models in first and second stages, as discussed below, according to some example embodiments. The server-side deep-feature adversarial system 150 may differ from the deep-feature adversarial system 210 executing on the client device 102 in that the server-side deep-feature adversarial system 150 manages training the models and the deep-feature adversarial system 210 manages implementing the models to generate modified data items, according to some example embodiments. In some example embodiments, the deep feature adversarial system can be implemented on non-mobile devices, such as a laptop or desktop computer, a server, and so forth, and it is appreciated that the below examples are not limited to mobile device implementations.

The application server 112 is communicatively coupled to a database server 118, which facilitates access to a database 120 in which is stored data associated with messages processed by the messaging server application 114.

Figure 2:
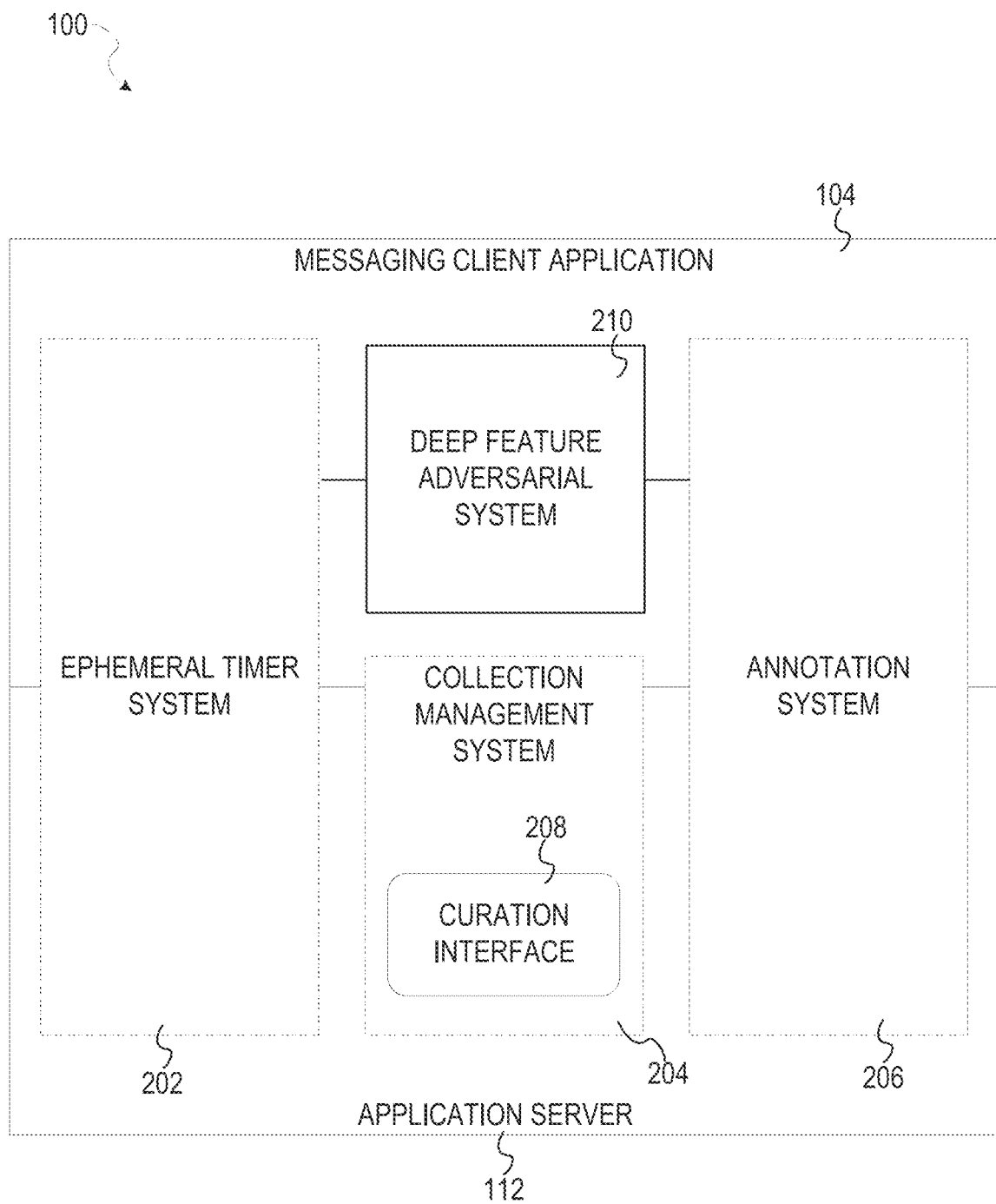
FIG. 2 is block diagram illustrating further details regarding a messaging system having an integrated virtual object machine learning system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of subsystems, namely an ephemeral timer system 202, a collection management system 204, an annotation system 206, and a deep-feature adversarial system 210.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message or collection of messages (e.g., a social media real-time sequence of user posts, a "story"), selectively display and enable access to messages and associated content via the messaging client application 104. Further details regarding the operation of the ephemeral timer system 202 are provided below.

The collection management system 204 is responsible for managing collections of media (e.g., collections of text, image, video, and audio data). In some examples, a collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user-generated content into a collection. In such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a real-time video filter applied to each video frame) to the messaging client application 104 based on a geolocation of the client device 102. In another example, the annotation system 206 operatively supplies a media overlay to the messaging client application 104 based on other information, such as social network information of the user of the client device 102. A media overlay may include audio and visual content and visual effects. Examples of audio and visual content include pictures, text, logos, animations, and sound effects. An example of a visual effect includes color overlaying. The audio and visual content or the visual effects can be applied to a media content item (e.g., a photo) at the client device 102. For example, the media overlay includes text that can be overlaid on top of a photograph generated by the client device 102. In another example, the media overlay includes an identification of a location (e.g., Venice Beach), a name of a live event, or a name of a merchant (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map and upload content associated with the selected geolocation. The user may also specify circumstances under which particular content should be offered to other users. The annotation system 206 generates a media overlay that includes the uploaded content and associates the uploaded content with the selected geolocation.

In another example embodiment, the annotation system 206 provides a merchant-based publication platform that enables merchants to select a particular media overlay associated with a geolocation via a bidding process. For example, the annotation system 206 associates the media overlay of a highest-bidding merchant with a corresponding geolocation for a predefined amount of time.

The deep-feature adversarial system 210 is a client-side instance that is configured to transform data objects from an initial domain to a target domain using an adversarially trained deep feature neural network, as discussed in further detail below.

Figure 3:
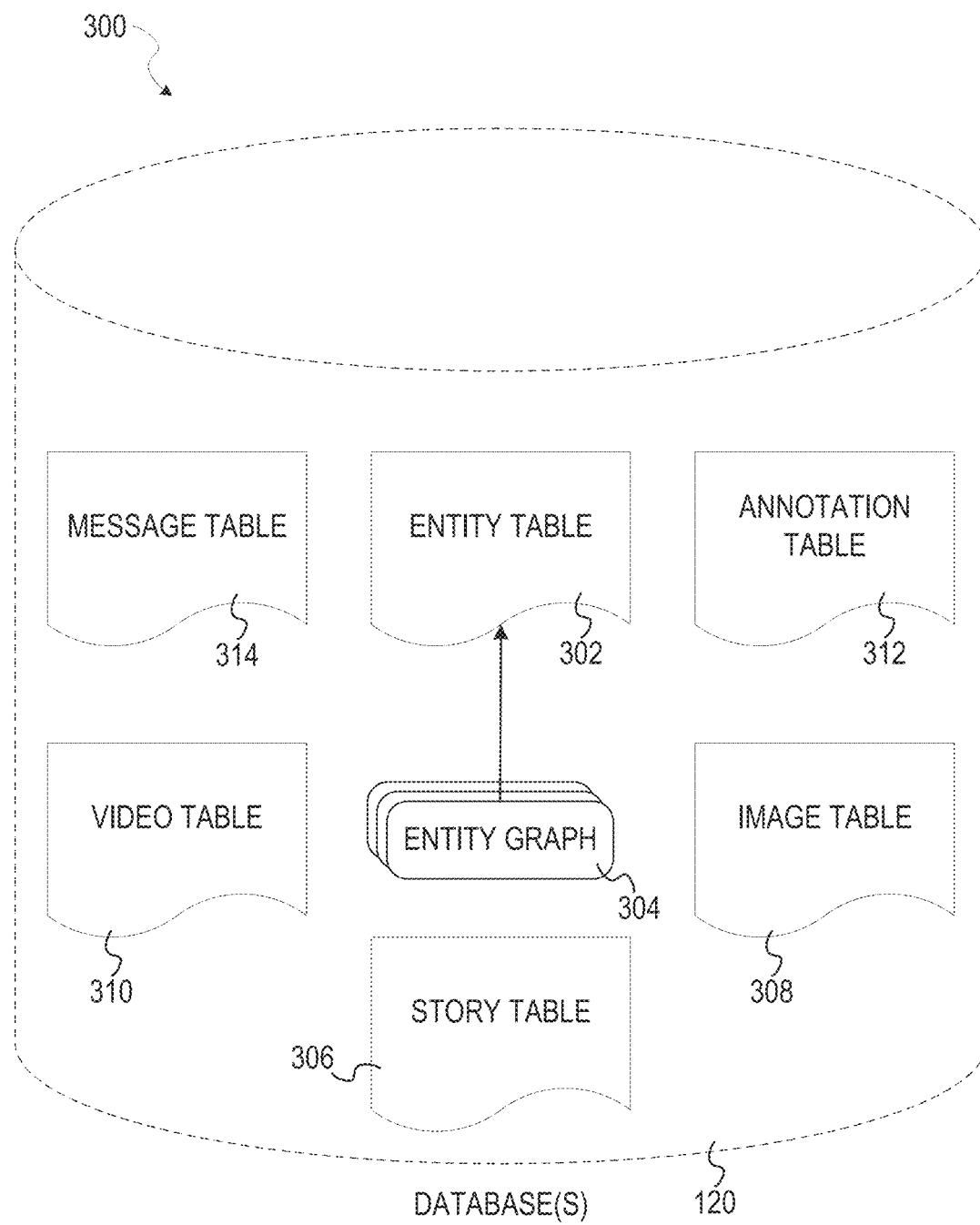
FIG. 3 is a schematic diagram illustrating data which may be stored in a database of a messaging server system, according to certain example embodiments.

FIG. 3 is a schematic diagram illustrating data 300 which may be stored in the database 120 of the messaging server system 108, according to certain example embodiments. While the content of the database 120 is shown to comprise a number of tables, it will be appreciated that the data could be stored in other types of data structures (e.g., as an object-oriented database).

The database 120 includes message data stored within a message table 314. An entity table 302 stores entity data, including an entity graph 304. Entities for which records are maintained within the entity table 302 may include individuals, corporate entities, organizations, objects, places, events, and so forth. Regardless of type, any entity regarding which the messaging server system 108 stores data may be a recognized entity. Each entity is provided with a unique identifier, as well as an entity type identifier (not shown).

The entity graph 304 furthermore stores information regarding relationships and associations between or among entities. Such relationships may be social, professional (e.g., work at a common corporation or organization), interest-based, or activity-based, for example.

The database 120 also stores annotation data, in the example form of filters, in an annotation table 312. Filters for which data is stored within the annotation table 312 are associated with and applied to videos (for which data is stored in a video table 310) and/or images (for which data is stored in an image table 308). Filters, in one example, are overlays that are displayed as overlaid on an image or video during presentation to a recipient user. Filters may be of various types, including user-selected filters from a gallery of filters presented to a sending user by the messaging client application 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client application 104, based on geolocation information determined by a Global Positioning System (GPS) unit of the client device 102. Another type of filter is a data filter, which may be selectively presented to a sending user by the messaging client application 104, based on other inputs or information gathered by the client device 102 during the message creation process. Examples of data filters include a current temperature at a specific location, a current speed at which a sending user is traveling, a battery life for a client device 102, or the current time.

Other annotation data that may be stored within the image table 308 is so-called "lens" data. A "lens" may be a real-time special effect and sound that may be added to an image or a video.

As mentioned above, the video table 310 stores video data which, in one embodiment, is associated with messages for which records are maintained within the message table 314. Similarly, the image table 308 stores image data associated with messages for which message data is stored in the message table 314. The entity table 302 may associate various annotations from the annotation table 312 with various images and videos stored in the image table 308 and the video table 310.

A story table 306 stores data regarding collections of messages and associated image, video, or audio data, which are compiled into a collection (e.g., a story or a gallery). The creation of a particular collection may be initiated by a particular user (e.g., each user for whom a record is maintained in the entity table 302). A user may create a "personal story" in the form of a collection of content that has been created and sent/broadcast by that user. To this end, the user interface of the messaging client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices 102 have location services enabled and are at a common location or event at a particular time may, for example, be presented with an option, via a user interface of the messaging client application 104, to contribute content to a particular live story. The live story may be identified to the user by the messaging client application 104 based on his or her location. The end result is a "live story" told from a community perspective.

A further type of content collection is known as a "location story," which enables a user whose client device 102 is located within a specific geographic location (e.g., on a college or university campus) to contribute to a particular collection. In some embodiments, a contribution to a location story may require a second degree of authentication to verify that the end user belongs to a specific organization or other entity (e.g., is a student on the university campus).

Figure 4:
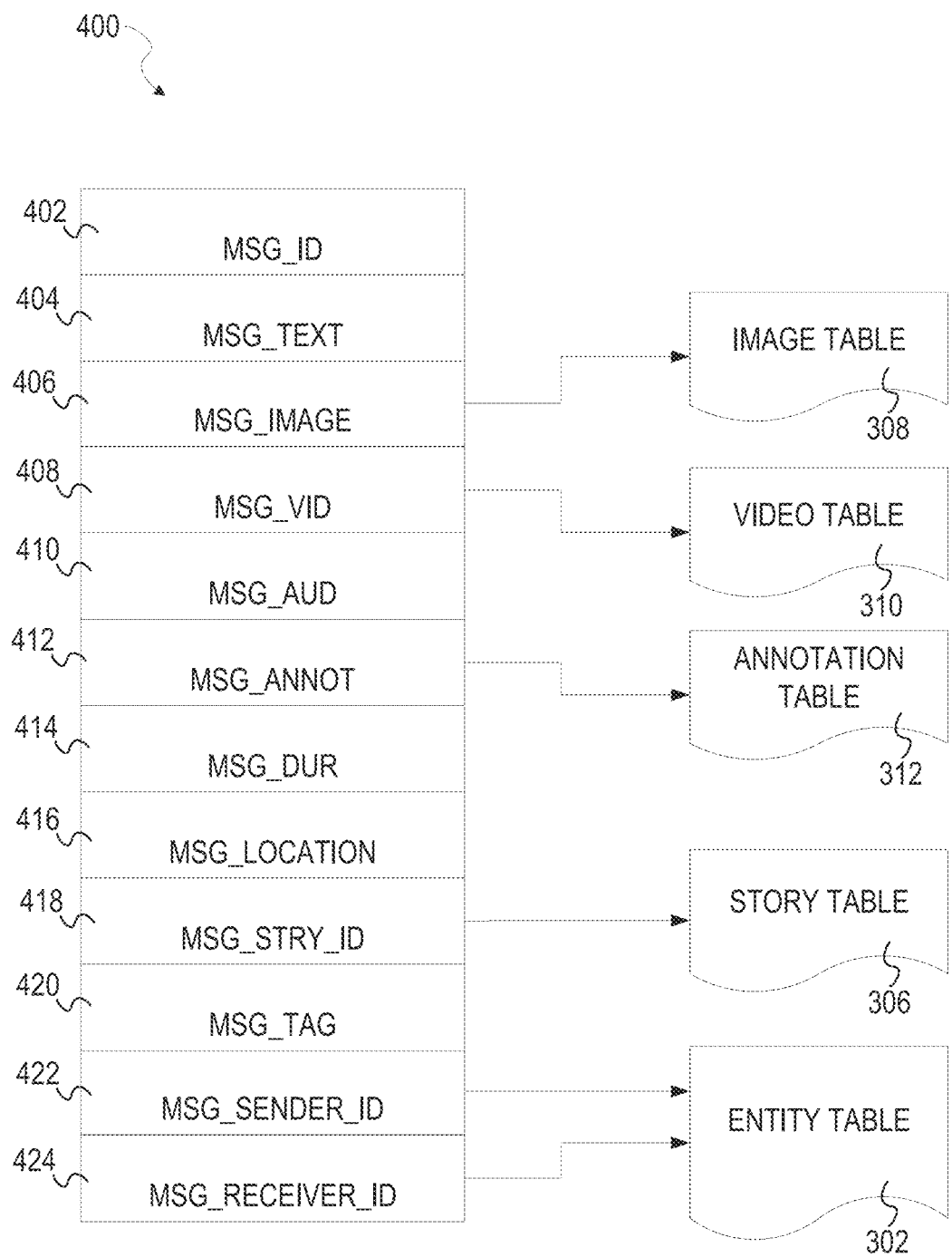
FIG. 4 is a schematic diagram illustrating a structure of a message, according to some embodiments, generated by a messaging client application for communication.

FIG. 4 is a schematic diagram illustrating a structure of a message 400, according to some embodiments, generated by a messaging client application 104 for communication to a further messaging client application 104 or the messaging server application 114. The content of a particular message 400 is used to populate the message table 314 stored within the database 120, accessible by the messaging server application 114. Similarly, the content of a message 400 is stored in memory as "in-transit" or "in-flight" data of the client device 102 or the application server 112. The message 400 is shown to include the following components:

A message identifier 402: a unique identifier that identifies the message 400.

A message text payload 404: text, to be generated by a user via a user interface of the client device 102 and that is included in the message 400.

A message image payload 406: image data captured by a camera component of a client device 102 or retrieved from memory of a client device 102, and that is included in the message 400.

A message video payload 408: video data captured by a camera component or retrieved from a memory component of the client device 102, and that is included in the message 400.

A message audio payload 410: audio data captured by a microphone or retrieved from the memory component of the client device 102, and that is included in the message 400.

Message annotations 412: annotation data (e.g., filters, stickers, or other enhancements) that represents annotations to be applied to the message image payload 406, message video payload 408, or message audio payload 410 of the message 400.

A message duration parameter 414: a parameter value indicating, in seconds, the amount of time for which content of the message 400 (e.g., the message image payload 406, message video payload 408, and message audio payload 410) is to be presented or made accessible to a user via the messaging client application 104.

A message geolocation parameter 416: geolocation data (e.g., latitudinal and longitudinal coordinates) associated with the content payload of the message 400. Multiple message geolocation parameter 416 values may be included in the payload, with each of these parameter values being associated with respective content items included in the content (e.g., a specific image in the message image payload 406, or a specific video in the message video payload 408).

A message story identifier 418: identifies values identifying one or more content collections (e.g., "stories") with which a particular content item in the message image payload 406 of the message 400 is associated. For example, multiple images within the message image payload 406 may each be associated with multiple content collections using identifier values.

A message tag 420: one or more tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

A message sender identifier 422: an identifier (e.g., a messaging system identifier, email address, or device identifier) indicative of a user of the client device 102 on which the message 400 was generated and from which the message 400 was sent.

A message receiver identifier 424: an identifier (e.g., a messaging system identifier, email address, or device identifier) indicative of a user of the client device 102 to which the message 400 is addressed.

The contents (e.g., values) of the various components of the message 400 may be pointers to locations in tables within which content data values are stored. For example, an image value in the message image payload 406 may be a pointer to (or address of) a location within the image table 308. Similarly, values within the message video payload 408 may point to data stored within the video table 310, values stored within the message annotations 412 may point to data stored in the annotation table 312, values stored within the message story identifier 418 may point to data stored in the story table 306, and values stored within the message sender identifier 422 and the message receiver identifier 424 may point to user records stored within the entity table 302.

Figure 5:
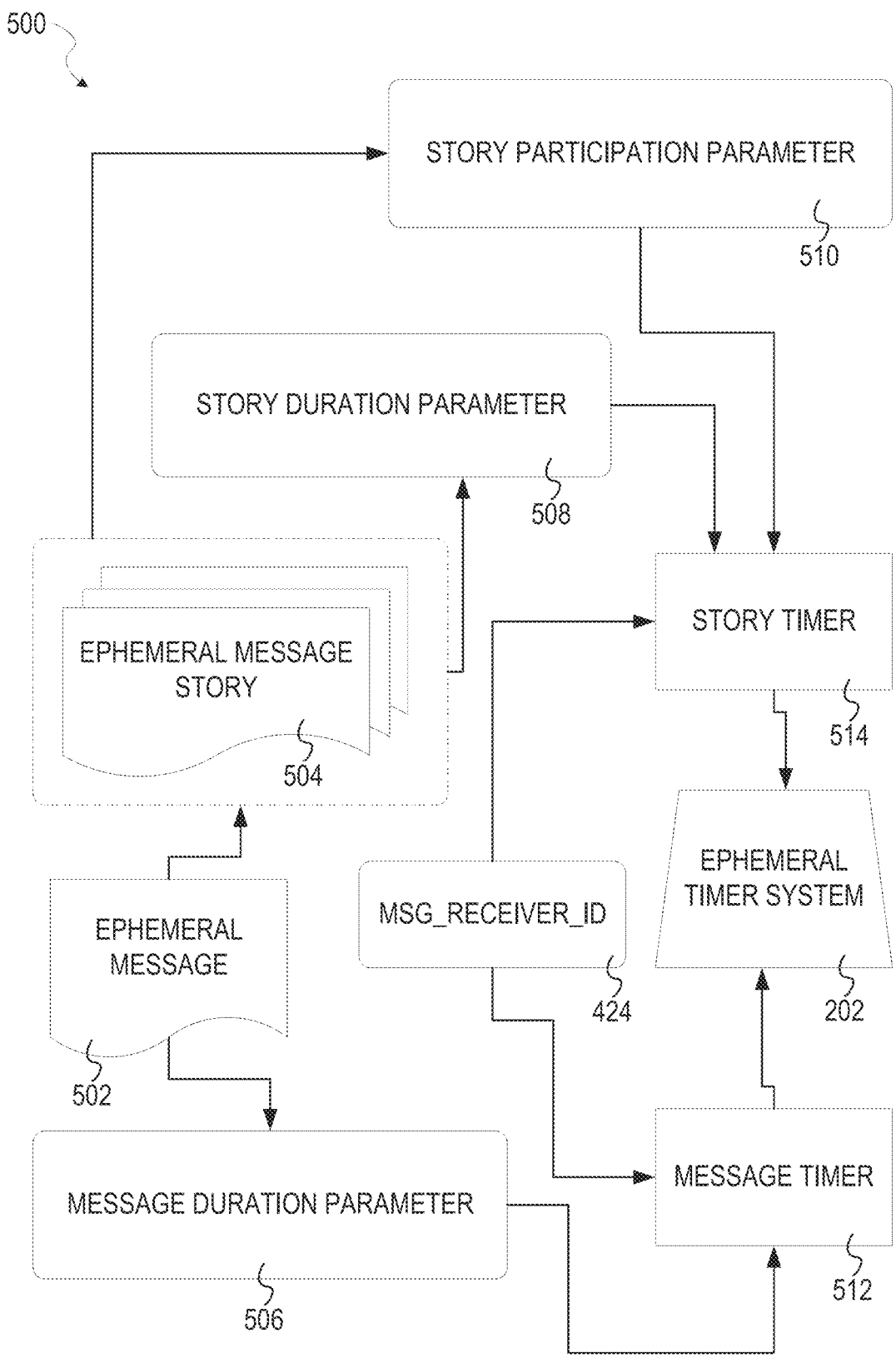
FIG. 5 is a schematic diagram illustrating an example access-limiting process, in terms of which access to content (e.g., an ephemeral message, and associated multimedia payload of data) or a content collection (e.g., an ephemeral message story) may be time-limited (e.g., made ephemeral).

FIG. 5 is a schematic diagram illustrating an access-limiting process 500, in terms of which access to content (e.g., an ephemeral message 502, and associated multimedia payload of data) or a content collection (e.g., an ephemeral message story 504) may be time-limited (e.g., made ephemeral).

An ephemeral message 502 is shown to be associated with a message duration parameter 506, the value of which determines an amount of time that the ephemeral message 502 will be displayed to a receiving user of the ephemeral message 502 by the messaging client application 104. In one embodiment, where the messaging client application 104 is an application client, an ephemeral message 502 is viewable by a receiving user for up to a maximum of 10 seconds, depending on the amount of time that the sending user specifies using the message duration parameter 506.

The message duration parameter 506 and the message receiver identifier 424 are shown to be inputs to a message timer 512, which is responsible for determining the amount of time that the ephemeral message 502 is shown to a particular receiving user identified by the message receiver identifier 424. In particular, the ephemeral message 502 will only be shown to the relevant receiving user for a time period determined by the value of the message duration parameter 506. The message timer 512 is shown to provide output to a more generalized ephemeral timer system 202, which is responsible for the overall timing of display of content (e.g., an ephemeral message 502) to a receiving user.

The ephemeral message 502 is shown in FIG. 5 to be included within an ephemeral message story 504 (e.g., a personal story, or an event story). The ephemeral message story 504 has an associated story duration parameter 508, a value of which determines a time duration for which the ephemeral message story 504 is presented and accessible to users of the messaging system 100. The story duration parameter 508, for example, may be the duration of a music concert, where the ephemeral message story 504 is a collection of content pertaining to that concert. Alternatively, a user (either the owning user or a curator user) may specify the value for the story duration parameter 508 when performing the setup and creation of the ephemeral message story 504.

Additionally, each ephemeral message 502 within the ephemeral message story 504 has an associated story participation parameter 510, a value of which determines the duration of time for which the ephemeral message 502 will be accessible within the context of the ephemeral message story 504. Accordingly, a particular ephemeral message 502 may "expire" and become inaccessible within the context of the ephemeral message story 504, prior to the ephemeral message story 504 itself expiring in terms of the story duration parameter 508. The story duration parameter 508, story participation parameter 510, and message receiver identifier 424 each provide input to a story timer 514, which operationally determines whether a particular ephemeral message 502 of the ephemeral message story 504 will be displayed to a particular receiving user and, if so, for how long. Note that the ephemeral message story 504 is also aware of the identity of the particular receiving user as a result of the message receiver identifier 424.

Accordingly, the story timer 514 operationally controls the overall lifespan of an associated ephemeral message story 504, as well as an individual ephemeral message 502 included in the ephemeral message story 504. In one embodiment, each and every ephemeral message 502 within the ephemeral message story 504 remains viewable and accessible for a time period specified by the story duration parameter 508. In a further embodiment, a certain ephemeral message 502 may expire, within the context of the ephemeral message story 504, based on a story participation parameter 510. Note that a message duration parameter 506 may still determine the duration of time for which a particular ephemeral message 502 is displayed to a receiving user, even within the context of the ephemeral message story 504. Accordingly, the message duration parameter 506 determines the duration of time that a particular ephemeral message 502 is displayed to a receiving user, regardless of whether the receiving user is viewing that ephemeral message 502 inside or outside the context of an ephemeral message story 504.

The ephemeral timer system 202 may furthermore operationally remove a particular ephemeral message 502 from the ephemeral message story 504 based on a determination that it has exceeded an associated story participation parameter 510. For example, when a sending user has established a story participation parameter 510 of 24 hours from posting, the ephemeral timer system 202 will remove the relevant ephemeral message 502 from the ephemeral message story 504 after the specified 24 hours. The ephemeral timer system 202 also operates to remove an ephemeral message story 504 either when the story participation parameter 510 for each and every ephemeral message 502 within the ephemeral message story 504 has expired, or when the ephemeral message story 504 itself has expired in terms of the story duration parameter 508.

In certain use cases, a creator of a particular ephemeral message story 504 may specify an indefinite story duration parameter 508. In this case, the expiration of the story participation parameter 510 for the last remaining ephemeral message 502 within the ephemeral message story 504 will determine when the ephemeral message story 504 itself expires. In this case, a new ephemeral message 502, added to the ephemeral message story 504, with a new story participation parameter 510, effectively extends the life of an ephemeral message story 504 to equal the value of the story participation parameter 510.

In response to the ephemeral timer system 202 determining that an ephemeral message story 504 has expired (e.g., is no longer accessible), the ephemeral timer system 202 communicates with the messaging system 100 (e.g., specifically, the messaging client application 104) to cause an indicium (e.g., an icon) associated with the relevant ephemeral message story 504 to no longer be displayed within a user interface of the messaging client application 104. Similarly, when the ephemeral timer system 202 determines that the message duration parameter 506 for a particular ephemeral message 502 has expired, the ephemeral timer system 202 causes the messaging client application 104 to no longer display an indicium (e.g., an icon or textual identification) associated with the ephemeral message 502.

Figure 6:
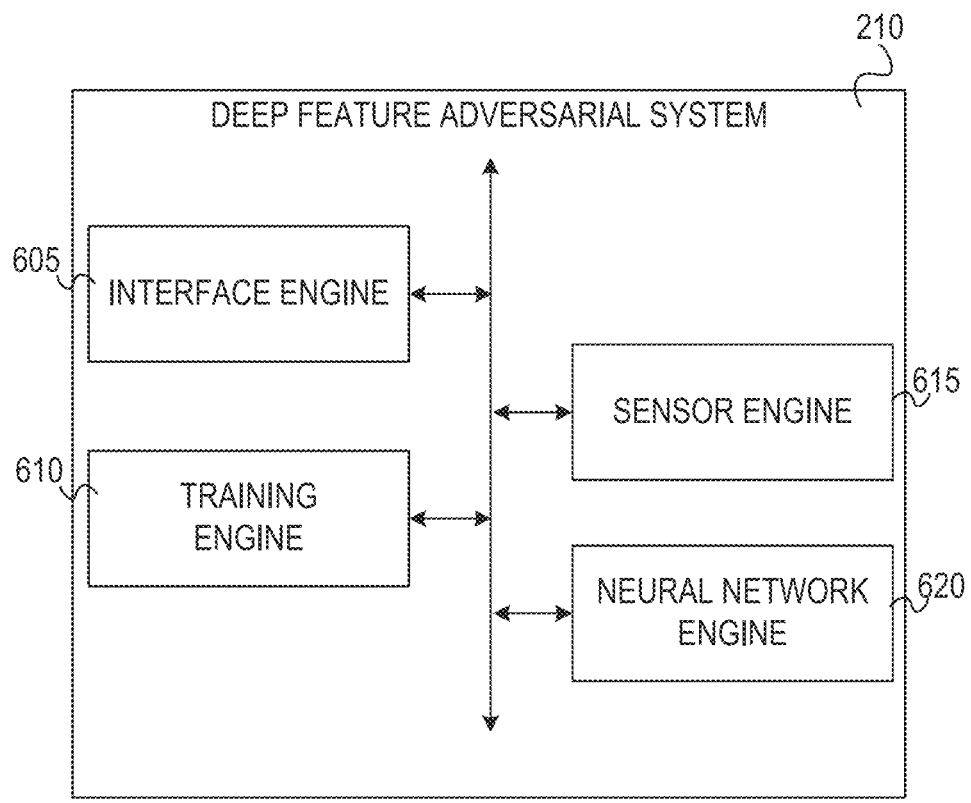
FIG. 6 shows example internal functional engines of a deep-feature adversarial system, according to some example embodiments.

FIG. 6 shows example internal functional engines of the deep-feature adversarial system 210, according to some example embodiments. As illustrated, the deep-feature adversarial system 210 comprises an interface engine 605, a training engine 610, a sensor engine 615, and a neural network engine 620. The interface engine 605 manages receiving inputs and displaying user interface content on a user device, such as a client device 102. The training engine 610 is configured to train a deep-feature adversarial network to generate modified data items, such as a modified image, a modified image sequence (e.g., video), a modified audio recording, and so on. The sensor engine 615 is configured to generate the data items for modification by the neural network engine 620. For example, the sensor engine 615 is configured to use an image sensor of a user device (e.g., mobile phone) to generate images for processing and modification; or use a microphone of a user device to record an audio recording for processing and modification. The neural network engine 620 is configured to apply a deep-feature adversarially trained neural network to a data item to generate a modified data item, as discussed in further detail below. In some example embodiments, one or more of the engines may be located in the server-side deep-feature adversarial system 150 or the deep-feature adversarial system 210 on the client device. For example, in some example embodiments, the training engine 610 is hosted solely on the server-side deep-feature adversarial system 150, which is then used to train models that are distributed via the network 106 for execution by the neural network engine 620 on the client device 102.

Figure 7:
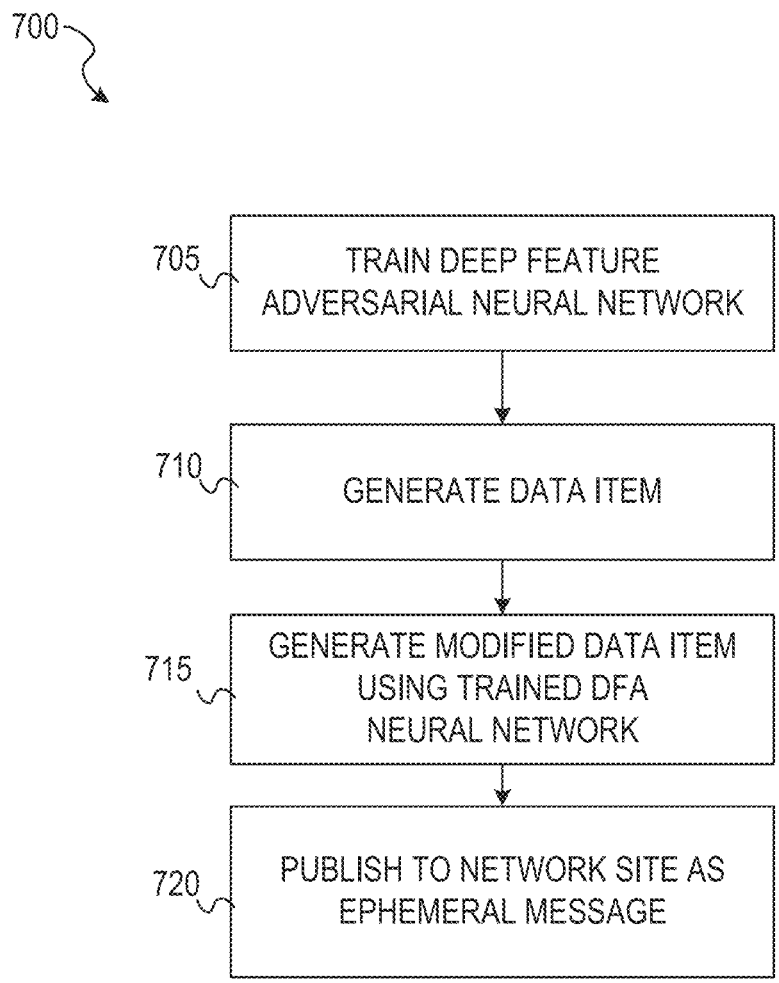
FIG. 7 shows a flow diagram of an example method for generating modified data items using a deep-feature adversarial system, according to some example embodiments.

FIG. 7 shows a flow diagram of an example method 700 for generating modified data items using a deep-feature adversarial system 210, according to some example embodiments. At operation 705, the training engine 610 trains a deep-feature adversarial neural network to generate modified data items, as discussed in further detail with reference to FIGS. 8, 9, and 10. At operation 710, the sensor engine 615 generates a data item, such as an image or an audio recording. At operation 715, the neural network engine 620 generates a modified data item by applying the trained deep-feature adversarial neural network model to the data item. At operation 720, the interface engine 605 publishes the modified data item to a network site as an ephemeral message, according to some example embodiments.

Figure 8:
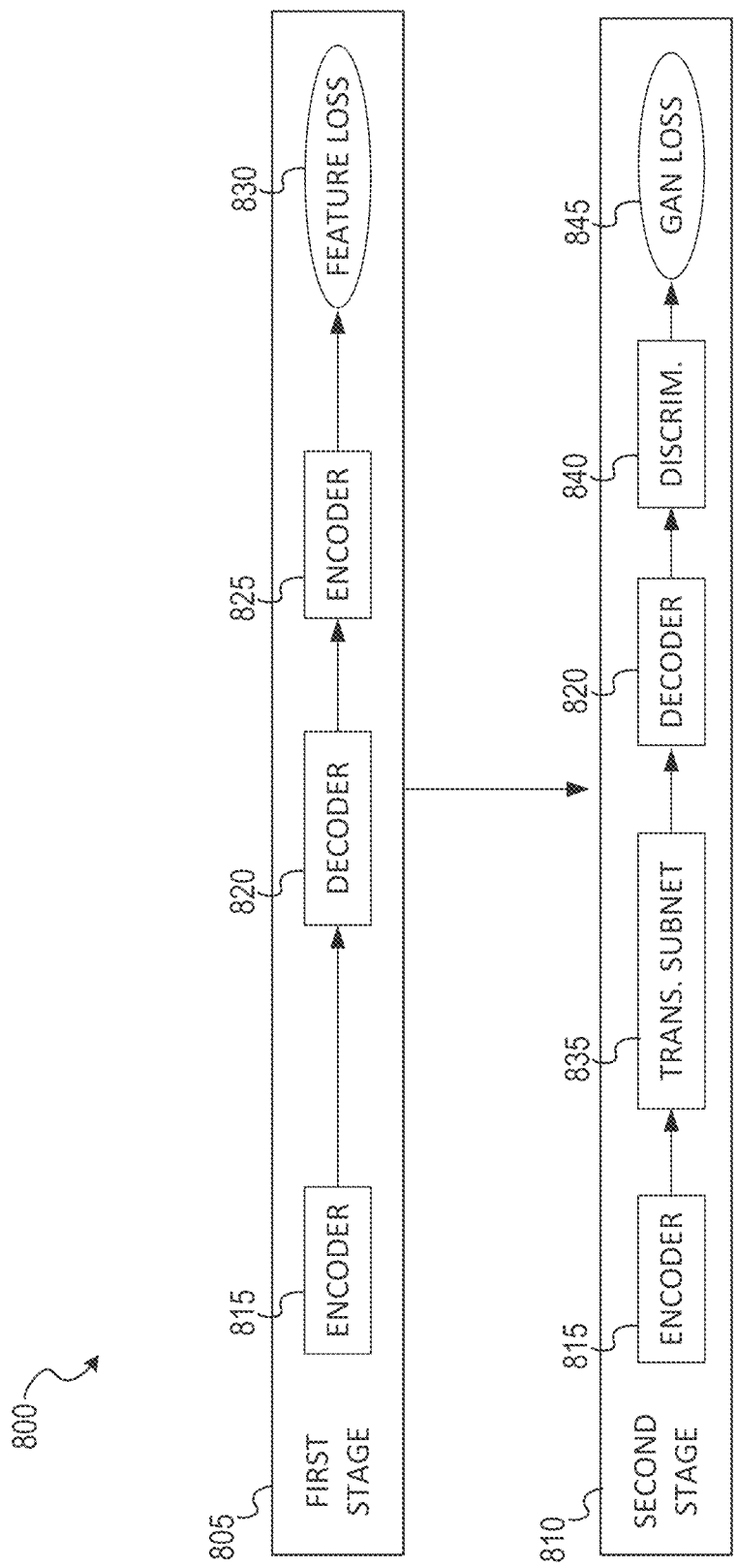
FIG. 8 shows a data architecture for training a deep-feature adversarial neural network according to some example embodiments.

FIG. 8 shows a data architecture 800 for training a deep-feature adversarial neural network according to some example embodiments. In the example of FIG. 8, an image is the item being modified, however it is appreciated the data architecture can be configured to modify different types of data items (e.g., music data) using generative neural networks. At a high level, in the first stage 805, the generator components are trained to encode and decode an image, and in the second stage 810, the generator components are fixed and a transformation subnetwork is trained to apply a transformation effect using adversarial training.

With reference to the first stage 805, the encoder 815 receives input data (not depicted in FIG. 8) and generates a deep-feature representation of the input data, which is then input into the decoder 820, which decodes the deep-feature representation back into a reconstructed image. According to some example embodiments, feature loss 830 is implemented to train the components of the first stage 805 in an end-to-end training procedure. Further, as illustrated in the example embodiment of FIG. 8, the output from the decoder 820 can be encoded via an encoder 825 that is configured to measure per-pixel image similarity between the images (e.g., the image input into the encoder 815 and the reconstructed image generated by decoder 820). The encoder 825 further computes latent space features of the reconstructed image and the latent space features of the input image, which are compared via the feature loss 830. The overall similarity analyzed in the first stage 805 is then the per-pixel similarity and the latent space feature similarity between the input and reconstructed image. In this way, by implementing encoder 825, higher quality images are generated by the deep-feature adversarial system 210. Further, according to some example embodiments, the deep-feature adversarial system 210 can be implemented without the additional encoder 825 and still yield quality output data.

In the second stage 810, the encoder 815 and decoder 820 are already trained and held constant during the transformation subnetwork training, in which the network is trained to apply a particular transformation effect. In the example embodiment illustrated, the input data (e.g., a user self-portrait image, "selfie") is input into the now trained encoder 815, which generates a deep-feature representation, which is then transformed by the transformation subnetwork 835 into a transformed deep-feature representation. The transformed deep-feature representation is then decoded back into image space to generate a reconstructed image of the target domain which is then evaluated by the discrimination layer 840, and loss training occurs by way of generative adversarial (GAN) loss 845.

After the two-stage training, the neural network model is then stored or transmitted to client devices for implementation data, such as an image, an image sequence (e.g., video), audio, or other types of transformable data. In some example embodiments, only the encoder 815, the decoder 820, and the transformation subnetwork 835 are transmitted to client devices for implementation via neural network engine 620; that is, the discrimination layer 840 may remain on the application server side (e.g., within server-side deep-feature adversarial system 150).

In some example embodiments, the encoder 815 and the decoder 820 are initially transmitted to the client devices for storage in respective client device memories. Then, at a later time, the transformation subnetwork 835 trained for a certain transformation effect is distributed to the client devices for incorporation between the encoder 815 and decoder 820 in the respective client devices. This enables the generator to be trained once, and subsequent transformation training only need be performed for the transformation subnetwork 835, which is then transmitted to the client devices for application.

Figure 9:
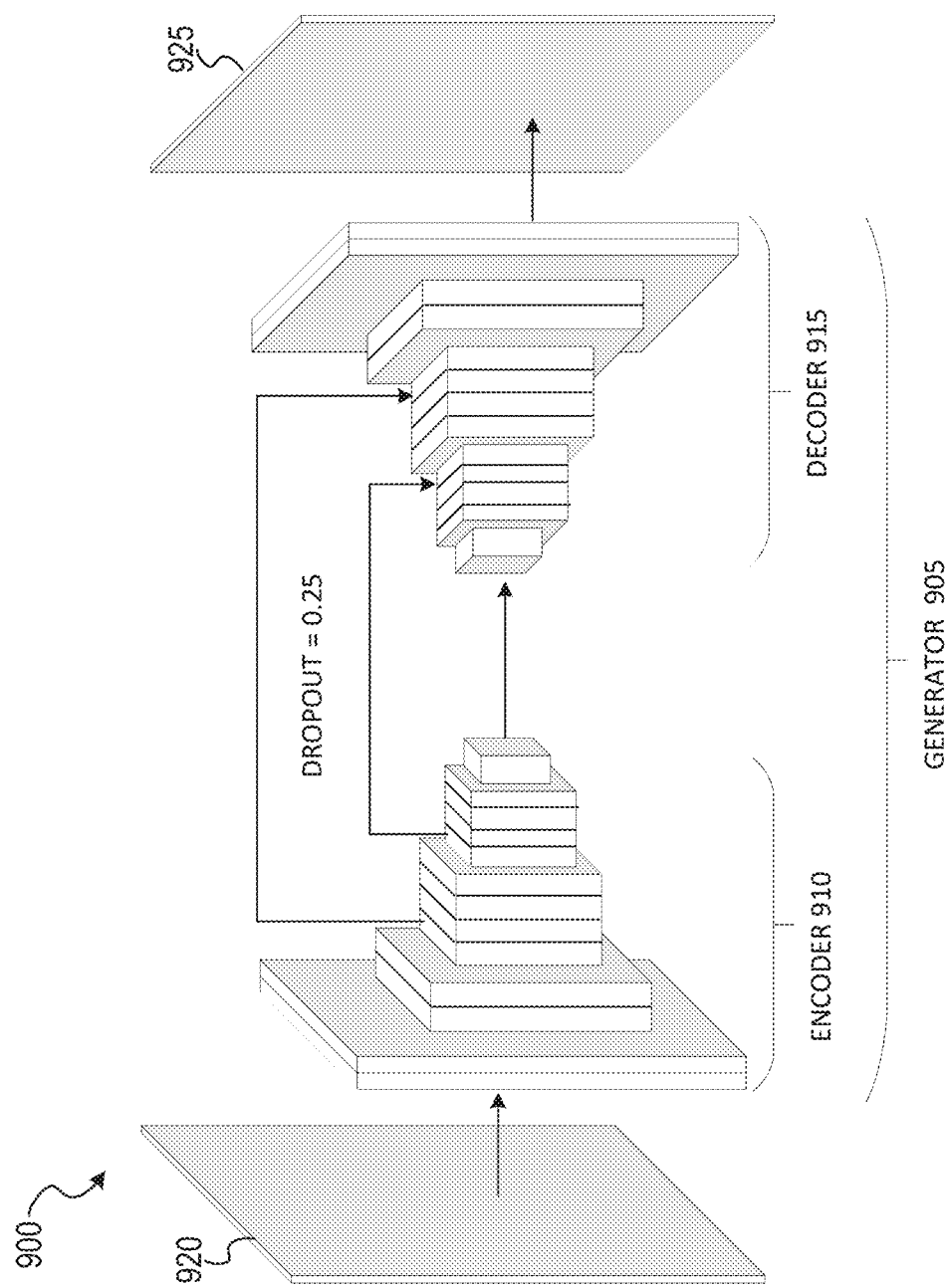
FIG. 9 shows an example deep-feature adversarial neural network architecture for first stage training, according to some example embodiments.

FIG. 9 shows an example deep-feature adversarial neural network architecture 900 in first stage training, according to some example embodiments. As discussed above, in the first stage of training, the generator is trained. In the example illustrated, the generator 905 (e.g., generator subnetwork) comprises an encoder 910 and a decoder 915. An image 920 is input into the encoder 910 that generates the deep-feature space representation, which is then decoded back into a reconstructed image 925 that is substantially identical to the input image 920.

In some example embodiments, the encoder 910 and the decoder 915 are trained jointly at the same time for the same training task, such as image inpainting or deblurring. However, the encoder 910 and decoder 915 need not be trained jointly, and in some example embodiments, the encoder 910 is first trained for a first image classification, and the decoder 915 is separately trained for a separate task (such as image recovery). Thus, the first stage training may include two separate sub-stages, including a encoder training sub-stage and a decoder training sub-stage.

As illustrated, the generator 905 can be trained using dropout, which is a computational task that forces the decoder 915 to use information from all layers, and not only the layer closest to the input image 920. The dropout approach assumes corruption of some latent space features that change the features values to zero. In the example illustrated, the value of "0.25" is the percentage of corrupted values. When corruption occurs, the decoder 915 attempts to recover lost information from deeper layers, thus achieving the result. However, it is possible to use other methods, which achieve the same goal, such as adding Gaussian noise to features instead of zeroing them, or jointly training the encoder-decoder pair for inpainting (reconstructing an original image from the corrupted one, where some areas of the image were cut off or damaged), deblurring (reconstructing the original image from its low-resolution version), and so on.

Figure 10:
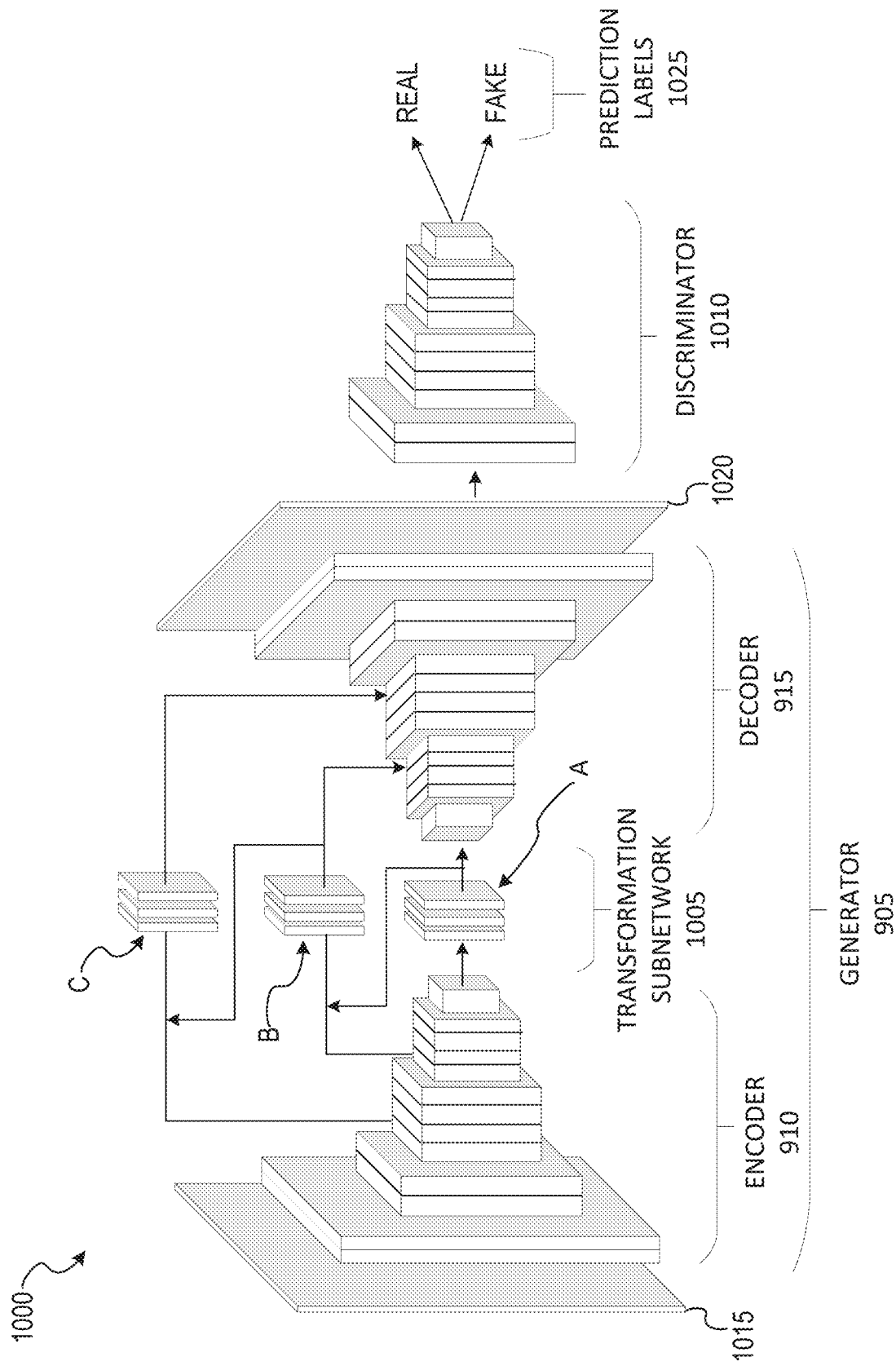
FIG. 10 shows an example deep-feature adversarial neural network architecture for second stage training, according to some example embodiments.

FIG. 10 shows an example deep-feature adversarial neural network architecture 1000 in second stage training, according to some example embodiments. In architecture 1000, the generator 905 has already been trained as discussed above, and the transformation subnetwork 1005 is trained to transform a deep-feature representation from an initial domain (e.g., a day time scene) to a target domain (e.g., a night time scene).

Architecturally, the transformation subnetwork 1005 comprises three convolutional layers A, B, and C. Each group of layers consists of 3 convolutional layers, which use 3×3 kernels. The last layer of each group produces a tensor of the same size and number of channels as the output tensor of the encoder, which serves as input for the first layer of this group, according to some example embodiments.

Further, as illustrated, an output of one group can serve as an input for another group (e.g., the output of "A" group layer is input into "B" group layer). As the input tensor sizes differ among groups (e.g., A, B, C), the output of a given layer is readjusted in size to be congruent as an input of another group. For example, the output of the last "A" group layer is a first size adjusted to match the "B" group layer, which is then merged with encoder layer data and then the merged data is input into the "B" group layer; likewise, the output of the last "B" group layer is a size adjusted and then input into the first "C" group layer (e.g., after merging with encoder generated data). According to some example embodiments, the inputs from a lower layer are merged with the input of that layer. For example, the output of the group A merges with input of the group B after the size adjustment transformation. In some example embodiments, the size adjusts include non-parametric (such as nearest neighbor upsampling) adjustments, or parametric (size adjustment is performed by another convolutional layer with trainable parameters) adjustments.

During training, the generator 905 receives an input image 1015 and generates a deep-feature representation in deep space that captures the middle-level and high-level features of the image 1015 using the encoder 910. The transformation subnetwork 1005 then transforms the deep-feature representation from an initial domain to a target domain. The decoder 915 then transforms the deep-feature space to pixel or image space to generate a reconstructed image 1020 that exhibits the style of the target domain. The discriminator 1010 then analyzes the reconstructed image 1020 and generates a prediction whether the reconstructed image 1020 is a real or genuine data item of the target domain, or a fake data item that is not of the target domain, as denoted by prediction labels 1025.

Figure 11:
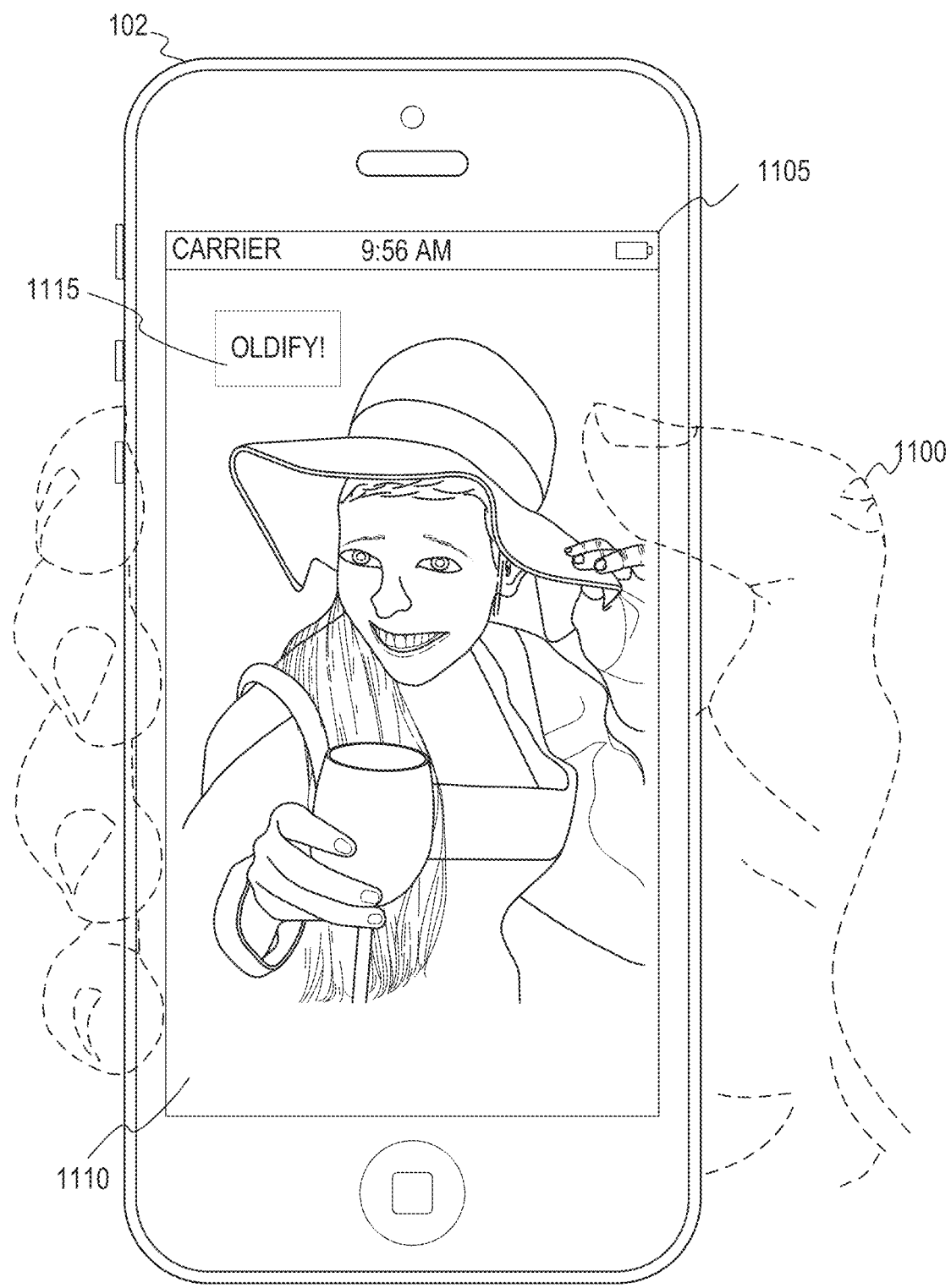
FIGS. 11-13 show an example user interface for using a deep-feature adversarial system, according to some example embodiments.

FIG. 11 shows an example user interface 1105 for generating an image and initiating processing using a deep-feature adversarial system according to some example embodiments. In the example illustrated, a user 1100 holding a client device 102 generates an image 1110, which is then displayed within a user interface 1105 generated by the interface engine 605. The user 1100 then selects a button 1115 that initiates deep-feature adversarial system 210 to apply an aging effect to the image 1110, which is a self-portrait of the user 1100.

Figure 12:
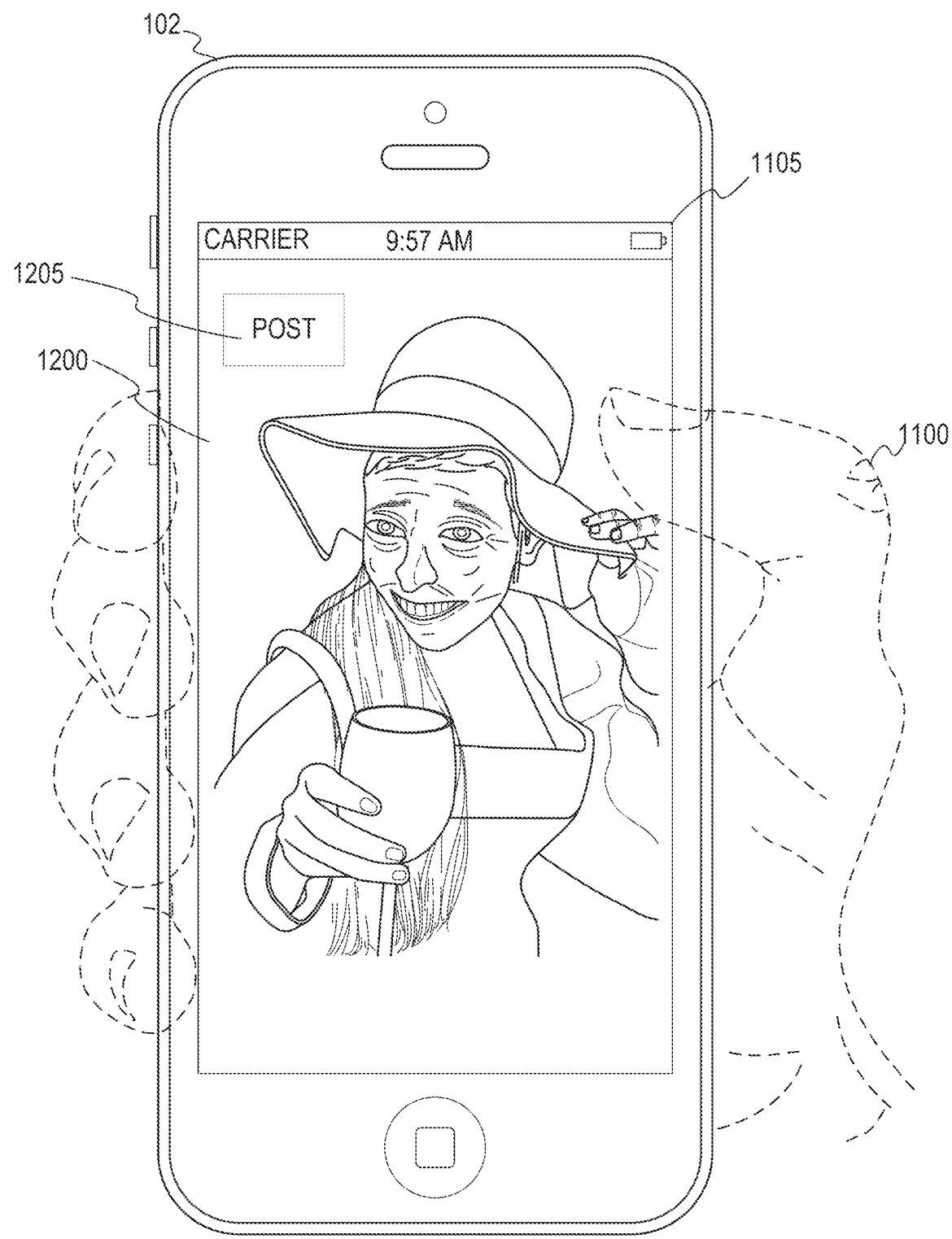

With reference to FIG. 12, in response to the selection of button 1115, the generator 905, which has been trained to apply an aging domain effect, transforms the image 1110 into image 1200, which displays the self-portrait of the user 1100 in an aged or older domain, as indicated by the wrinkles on the face. The user 1100 can then generate an ephemeral message that comprises image 1200 and post the ephemeral message on a social network site by selecting button 1205.

Figure 13:
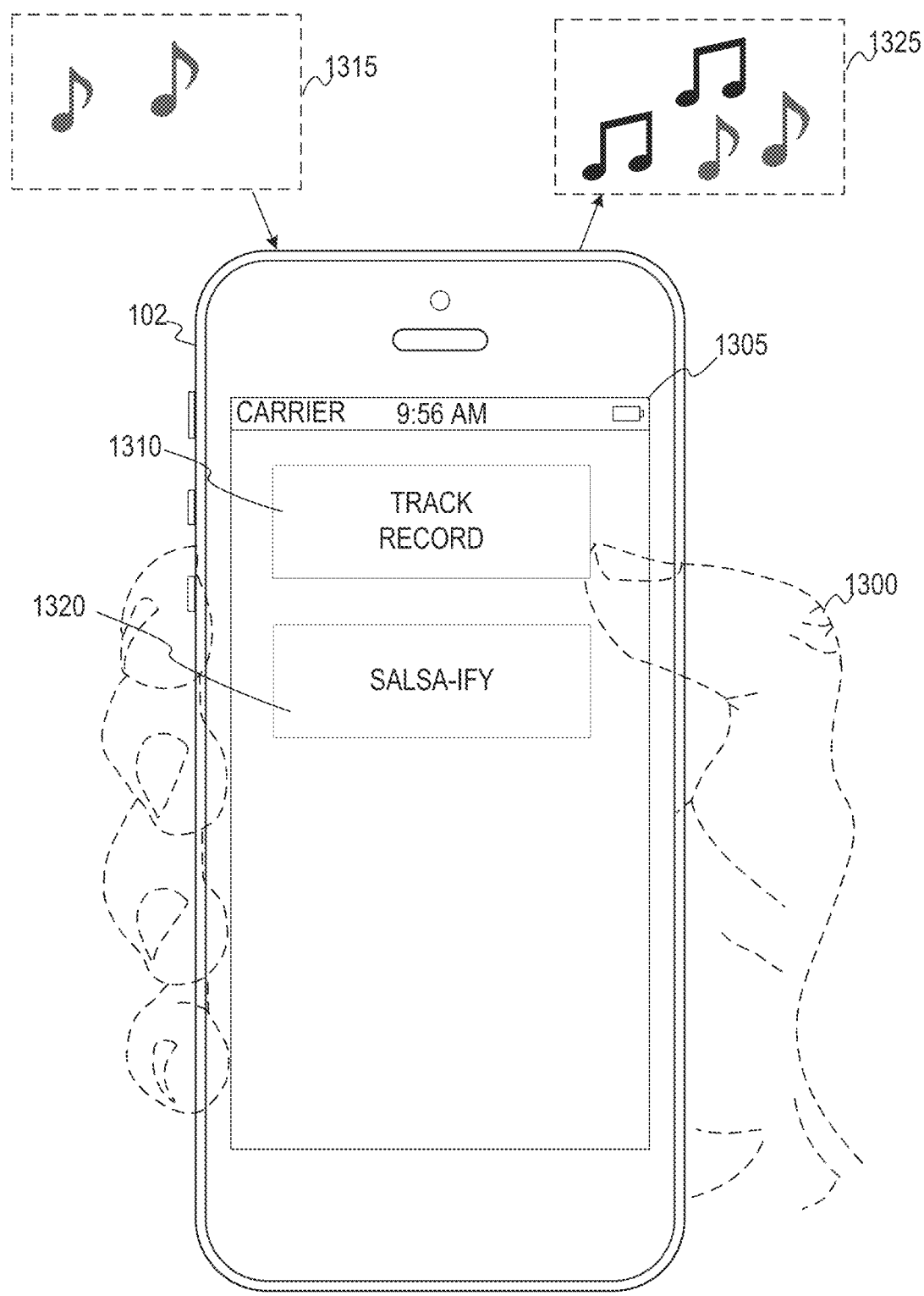

FIG. 13 show an example user interface 1305 for modifying a domain of an audio recording, according to some example embodiments. In the example illustrated, the user 1300 is holding a client device 102 that displays a user interface 1305 generated by interface engine 605 of the deep-feature adversarial system 210. The user 1300 selects button 1310 to record music 1315 in a first style (e.g., solo vocal track) and store the music 1315 as sound data in a memory of the client device 102. The user 1300 then selects button 1320 to trigger the deep-feature adversarial system 210 to apply a second musical style (e.g., salsa music with salsa drums), which is then output via a transducer (e.g., speaker) of the client device 102 as salsa music 1325. In some example embodiments, the recorded sound is stored as a stereogram, which is image data displaying features of the audio track, as is appreciated by those of ordinary skill in the art. The deep-feature adversarial system 210 can transform the stereogram exhibiting the first style (e.g., solo vocal track) to a target domain (e.g., salsa music) using the convolutional transformation discussed above.

Figure 14:
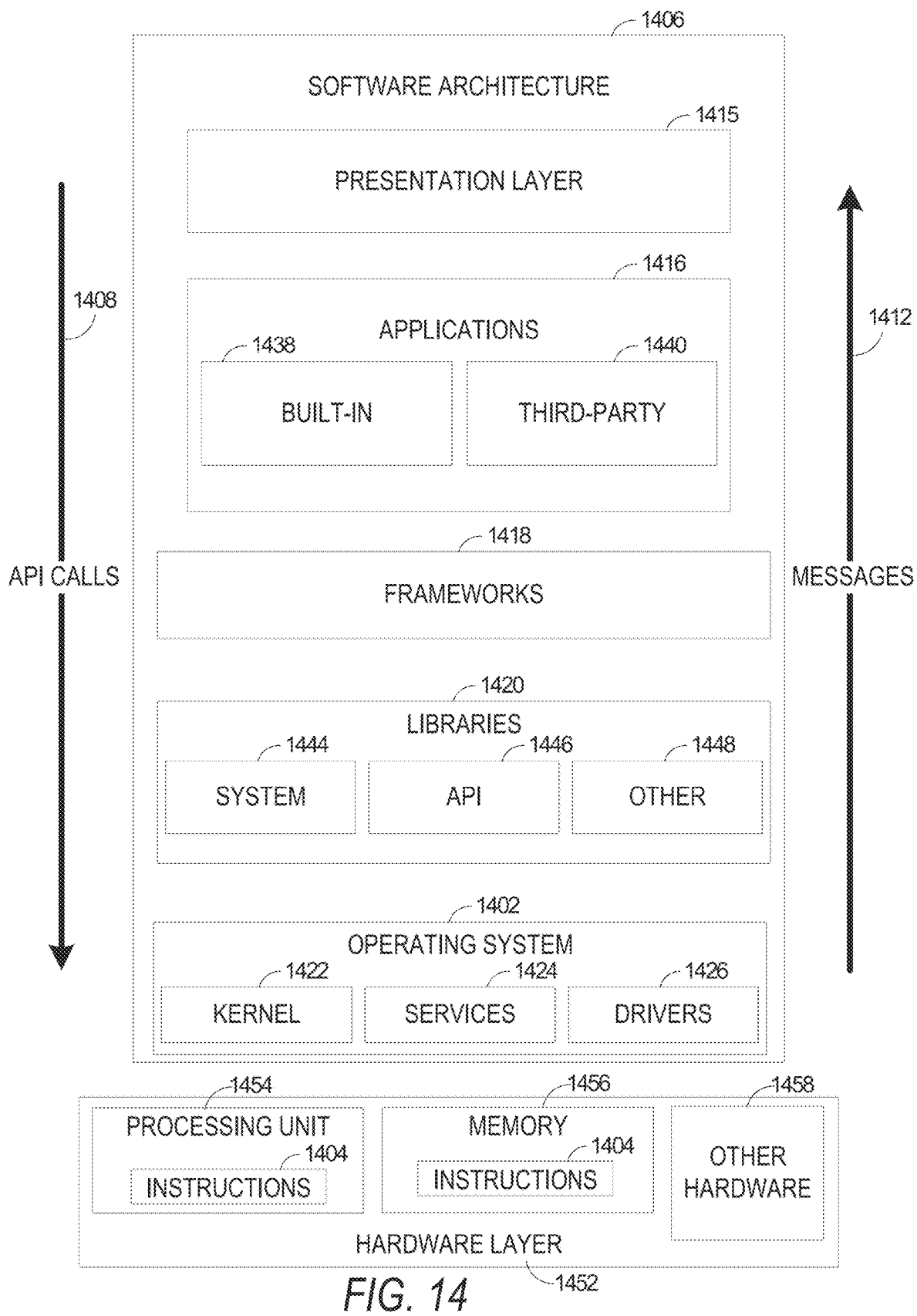
FIG. 14 is a block diagram illustrating a representative software architecture, which may be used in conjunction with various hardware architectures herein described.

FIG. 14 is a block diagram illustrating an example software architecture 1406, which may be used in conjunction with various hardware architectures herein described. FIG. 14 is a non-limiting example of a software architecture, and it will be appreciated that many other architectures may be implemented to facilitate the functionality described herein. The software architecture 1406 may execute on hardware such as a machine 1500 of FIG. 15 that includes, among other things, processors, memory, and I/O components. A representative hardware layer 1452 is illustrated and can represent, for example, the machine 1500 of FIG. 15. The representative hardware layer 1452 includes a processing unit 1454 having associated executable instructions 1404. The executable instructions 1404 represent the executable instructions of the software architecture 1406, including implementation of the methods, components, and so forth described herein. The hardware layer 1452 also includes a memory/storage 1456, which also has the executable instructions 1404. The hardware layer 1452 may also comprise other hardware 1458.

In the example architecture of FIG. 14, the software architecture 1406 may be conceptualized as a stack of layers where each layer provides particular functionality. For example, the software architecture 1406 may include layers such as an operating system 1402, libraries 1420, frameworks/middleware 1418, applications 1416, and a presentation layer 1415. Operationally, the applications 1416 and/or other components within the layers may invoke API calls 1408 through the software stack and receive a response in the form of messages 1412. The layers illustrated are representative in nature and not all software architectures have all layers. For example, some mobile or special-purpose operating systems may not provide a frameworks/middleware 1418, while others may provide such a layer. Other software architectures may include additional or different layers.

The operating system 1402 may manage hardware resources and provide common services. The operating system 1402 may include, for example, a kernel 1422, services 1424, and drivers 1426. The kernel 1422 may act as an abstraction layer between the hardware and the other software layers. For example, the kernel 1422 may be responsible for memory management, processor management (e.g., scheduling), component management, networking, security settings, and so on. The services 1424 may provide other common services for the other software layers. The drivers 1426 are responsible for controlling or interfacing with the underlying hardware. For instance, the drivers 1426 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 1420 provide a common infrastructure that is used by the applications 1416 and/or other components and/or layers. The libraries 1420 provide functionality that allows other software components to perform tasks in an easier fashion than by interfacing directly with the underlying operating system 1402 functionality (e.g., kernel 1422, services 1424, and/or drivers 1426). The libraries 1420 may include system libraries 1444 (e.g., C standard library) that may provide functions such as memory allocation functions, string manipulation functions, mathematical functions, and the like. In addition, the libraries 1420 may include API libraries 1446 such as media libraries (e.g., libraries to support presentation and manipulation of various media formats such as MPEG4, H..264, MP3, AAC, AMR, JPG, or PNG), graphics libraries (e.g., an OpenGL framework that may be used to render 2D and 3D graphic content on a display), database libraries (e.g., SQLite that may provide various relational database functions), web libraries (e.g., WebKit that may provide web browsing functionality), and the like. The libraries 1420 may also include a wide variety of other libraries 1448 to provide many other APIs to the applications 1416 and other software components/modules.

The frameworks/middleware 1418 provides a higher-level common infrastructure that may be used by the applications 1416 and/or other software components/modules. For example, the frameworks/middleware 1418 may provide various graphic user interface (GUI) functions, high-level resource management, high-level location services, and so forth. The frameworks/middleware 1418 may provide a broad spectrum of other APIs that may be utilized by the applications 1416 and/or other software components/modules, some of which may be specific to a particular operating system 1402 or platform.

The applications 1416 include built-in applications 1438 and/or third-party applications 1440. Examples of representative built-in applications 1438 may include, but are not limited to, a contacts application, a browser application, a book reader application, a location application, a media application, a messaging application, and/or a game application. The third-party applications 1440 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 1440 may invoke the API calls 1408 provided by the mobile operating system (such as the operating system 1402) to facilitate functionality described herein.

The applications 1416 may use built-in operating system functions (e.g., kernel 1422, services 1424, and/or drivers 1426), libraries 1420, and frameworks/middleware 1418 to create user interfaces to interact with users of the system. Alternatively, or additionally, in some systems, interactions with a user may occur through a presentation layer, such as the presentation layer 1415. In these systems, the application/component "logic" can be separated from the aspects of the application/component that interact with a user.

Figure 15:
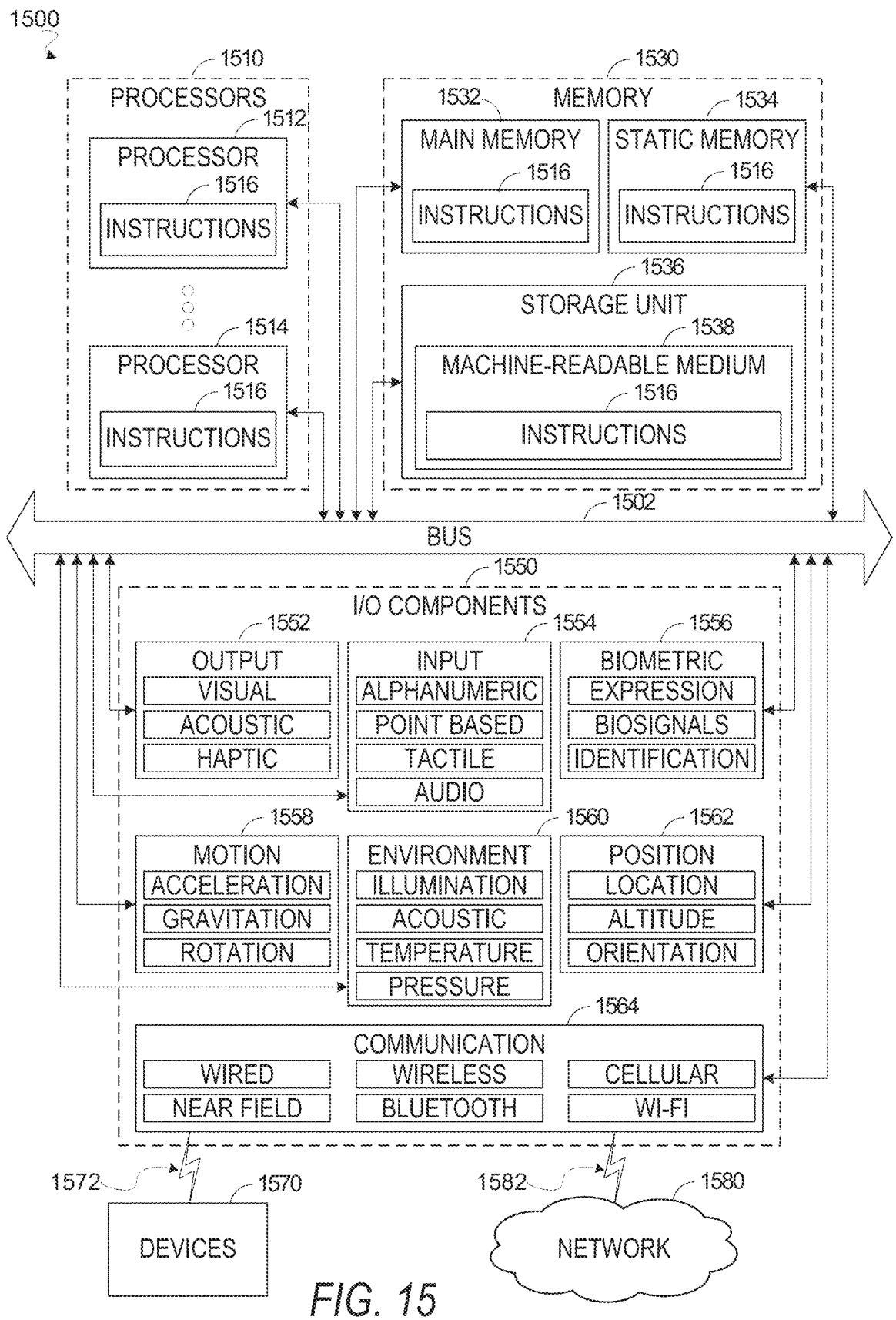
FIG. 15 is a block diagram illustrating components of a machine, according to some example embodiments, able to read instructions from a machine-readable medium (e.g., a machine-readable storage medium) and perform any one or more of the methodologies discussed herein.

FIG. 15 is a block diagram illustrating components of a machine 1500, according to some example embodiments, able to read instructions from a machine-readable medium (e.g., a machine-readable storage medium) and perform any one or more of the methodologies discussed herein. Specifically, FIG. 15 shows a diagrammatic representation of the machine 1500 in the example form of a computer system, within which instructions 1516 (e.g., software, a program, an application, an applet, an app, or other executable code) for causing the machine 1500 to perform any one or more of the methodologies discussed herein may be executed. As such, the instructions 1516 may be used to implement modules or components described herein. The instructions 1516 transform the general, non-programmed machine 1500 into a particular machine 1500 programmed to carry out the described and illustrated functions in the manner described. In alternative embodiments, the machine 1500 operates as a standalone device or may be coupled (e.g., networked) to other machines. In a networked deployment, the machine 1500 may operate in the capacity of a server machine or a client machine in a server-client network environment, or as a peer machine in a peer-to-peer (or distributed) network environment. The machine 1500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smart watch), a smart home device (e.g., a smart appliance), other smart devices, a web appliance, a network router, a network switch, a network bridge, or any machine capable of executing the instructions 1516, sequentially or otherwise, that specify actions to be taken by the machine 1500. Further, while only a single machine 1500 is illustrated, the term "machine" shall also be taken to include a collection of machines that individually or jointly execute the instructions 1516 to perform any one or more of the methodologies discussed herein.

The machine 1500 may include processors 1510, memory/storage 1530, and I/O components 1550, which may be configured to communicate with each other such as via a bus 1502. The memory/storage 1530 may include a memory 1532, such as a main memory or other memory storage, a static memory 1534, and a storage unit 1536, all accessible to the processors 1510 such as via the bus 1502. The storage unit 1536 and memory 1532 and static memory 1534 store the instructions 1516 embodying any one or more of the methodologies or functions described herein. The instructions 1516 may also reside, completely or partially, within the memory 1532, within the static memory 1534, within the storage unit 1536, within at least one of the processors 1510 (e.g., within the processor cache memory accessible to processors 1512 or 1514), or any suitable combination thereof, during execution thereof by the machine 1500. Accordingly, the memory 1532, the static memory 1534, the storage unit 1536, and the memory of the processors 1510 are examples of machine-readable media.

The I/O components 1550 may include a wide variety of components to receive input, provide output, produce output, transmit information, exchange information, capture measurements, and so on. The specific I/O components 1550 that are included in a particular machine 1500 will depend on the type of machine. For example, portable machines such as mobile phones will likely include a touch input device or other such input mechanisms, while a headless server machine will likely not include such a touch input device. It will be appreciated that the I/O components 1550 may include many other components that are not shown in FIG. 15. The I/O components 1550 are grouped according to functionality merely for simplifying the following discussion and the grouping is in no way limiting. In various example embodiments, the I/O components 1550 may include output components 1552 and input components 1554. The output components 1552 may include visual components (e.g., a display such as a plasma display panel (PDP), a light-emitting diode (LED) display, a liquid-crystal display (LCD), a projector, or a cathode ray tube (CRT)), acoustic components (e.g., speakers), haptic components (e.g., a vibratory motor, resistance mechanisms), other signal generators, and so forth. The input components 1554 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 1550 may include biometric components 1556, motion components 1558, environment components 1560, or position components 1562 among a wide array of other components. For example, the biometric components 1556 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1558 may include acceleration sensor components (e.g., accelerometer), gravitation sensor components, rotation sensor components (e.g., gyroscope), and so forth. The environment components 1560 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas sensors to detect concentrations of hazardous gases for safety or to measure pollutants in the atmosphere), or other components that may provide indications, measurements, or signals corresponding to a surrounding physical environment. The position components 1562 may include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1550 may include communication components 1564 operable to couple the machine 1500 to a network 1580 or devices 1570 via a coupling 1582 and a coupling 1572, respectively. For example, the communication components 1564 may include a network interface component or other suitable device to interface with the network 1580. In further examples, the communication components 1564 may include wired communication components, wireless communication components, cellular communication components, near field communication (NFC) components, Bluetooth® components (e.g., Bluetooth® Low Energy), Wi-Fi® components, and other communication components to provide communication via other modalities. The devices 1570 may be another machine or any of a wide variety of peripheral devices (e.g., a peripheral device coupled via a USB).

Moreover, the communication components 1564 may detect identifiers or include components operable to detect identifiers. For example, the communication components 1564 may include radio frequency identification (RFID) tag reader components, NFC smart tag detection components, optical reader components (e.g., an optical sensor to detect one-dimensional barcodes such as Universal Product Code (UPC) barcode, multi-dimensional barcodes such as Quick Response (QR) code, Aztec code, Data Matrix, Dataglyph, MaxiCode, PDF418, Ultra Code, UCC RSS-2D barcode, and other optical codes), or acoustic detection components (e.g., microphones to identify tagged audio signals). In addition, a variety of information may be derived via the communication components 1564, such as location via Internet Protocol (IP) geolocation, location via Wi-Fi® signal triangulation, location via detecting an NFC beacon signal that may indicate a particular location, and so forth.

"CARRIER SIGNAL" in this context refers to any intangible medium that is capable of storing, encoding, or carrying instructions 1516 for execution by the machine 1500, and includes digital or analog communications signals or other intangible media to facilitate communication of such instructions 1516. Instructions 1516 may be transmitted or received over the network 1580 using a transmission medium via a network interface device and using any one of a number of well-known transfer protocols.

"CLIENT DEVICE" in this context refers to any machine 1500 that interfaces to a communications network 1580 to obtain resources from one or more server systems or other client devices 102. A client device 102 may be, but is not limited to, a mobile phone, desktop computer, laptop, PDA, smartphone, tablet, ultrabook, netbook, multi-processor system, microprocessor-based or programmable consumer electronics system, game console, set-top box, or any other communication device that a user may use to access a network 1580.

"COMMUNICATIONS NETWORK" in this context refers to one or more portions of a network 1580 that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network 1580 may include a wireless or cellular network and the coupling may be a Code Division Multiple Access (CDMA) connection, a Global System for Mobile communications (GSM) connection, or another type of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long-Term Evolution (LTE) standard, others defined by various standard-setting organizations, other long-range protocols, or other data transfer technology.

"EPHEMERAL MESSAGE" in this context refers to a message 400 that is accessible for a time-limited duration. An ephemeral message 502 may be a text, an image, a video, and the like. The access time for the ephemeral message 502 may be set by the message sender. Alternatively, the access time may be a default setting or a setting specified by the recipient. Regardless of the setting technique, the message 400 is transitory.

"MACHINE-READABLE MEDIUM" in this context refers to a component, a device, or other tangible media able to store instructions 1516 and data temporarily or permanently and may include, but is not limited to, random-access memory (RAM), read-only memory (ROM), buffer memory, flash memory, optical media, magnetic media, cache memory, other types of storage (e.g., erasable programmable read-only memory (EPROM)), and/or any suitable combination thereof. The term "machine-readable medium" should be taken to include a single medium or multiple media (e.g., a centralized or distributed database, or associated caches and servers) able to store instructions 1516. The term "machine-readable medium" shall also be taken to include any medium, or combination of multiple media, that is capable of storing instructions 1516 (e.g., code) for execution by a machine 1500, such that the instructions 1516, when executed by one or more processors 1510 of the machine 1500, cause the machine 1500 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, a physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor 1512 or a group of processors 1510) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application-specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine 1500) uniquely tailored to perform the configured functions and is no longer general-purpose processors 1510. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering embodiments in which hardware components are temporarily configured (e.g., programmed), each of the hardware components need not be configured or instantiated at any one instance in time. For example, where a hardware component comprises a general-purpose processor 1512 configured by software to become a special-purpose processor, the general-purpose processor 1512 may be configured as respectively different special-purpose processors (e.g., comprising different hardware components) at different times. Software accordingly configures a particular processor 1512 or processors 1510, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between or among such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors 1510 that are temporarily configured (e.g., by software) or permanently configured to perform the relevant operations. Whether temporarily or permanently configured, such processors 1510 may constitute processor-implemented components that operate to perform one or more operations or functions described herein. As used herein, "processor-implemented component" refers to a hardware component implemented using one or more processors 1510. Similarly, the methods described herein may be at least partially processor-implemented, with a particular processor 1512 or processors 1510 being an example of hardware. For example, at least some of the operations of a method may be performed by one or more processors 1510 or processor-implemented components. Moreover, the one or more processors 1510 may also operate to support performance of the relevant operations in a "cloud computing" environment or as a "software as a service" (SaaS). For example, at least some of the operations may be performed by a group of computers (as examples of machines 1500 including processors 1510), with these operations being accessible via a network 1580 (e.g., the Internet) and via one or more appropriate interfaces (e.g., an API). The performance of certain of the operations may be distributed among the processors 1510, not only residing within a single machine 1500, but deployed across a number of machines 1500. In some example embodiments, the processors 1510 or processor-implemented components may be located in a single geographic location (e.g., within a home environment, an office environment, or a server farm). In other example embodiments, the processors 1510 or processor-implemented components may be distributed across a number of geographic locations.

"PROCESSOR" in this context refers to any circuit or virtual circuit (a physical circuit emulated by logic executing on an actual processor 1512) that manipulates data values according to control signals (e.g., "commands," "op codes," "machine code," etc.) and which produces corresponding output signals that are applied to operate a machine 1500. A processor may, for example, be a central processing unit (CPU), a reduced instruction set computing (RISC) processor, a complex instruction set computing (CISC) processor, a graphics processing unit (GPU), a digital signal processor (DSP), an ASIC, a radio-frequency integrated circuit (RFIC), or any combination thereof. A processor 1510 may further be a multi-core processor 1510 having two or more independent processors 1512, 1514 (sometimes referred to as "cores") that may execute instructions 1516 contemporaneously.

"TIMESTAMP" in this context refers to a sequence of characters or encoded information identifying when a certain event occurred, for example giving date and time of day, sometimes accurate to a small fraction of a second.

What is claimed is:

1. A method comprising:
    identifying a data item on a device;
    applying a neural network including an adversarial transformation subnetwork to apply a transformation to the data item to generate a modified data item, the neural network further comprising an encoder and a decoder, the neural network being trained in at least two stages, at least one of the encoder and the decoder being trained in a first stage and the adversarial transformation subnetwork being trained in a second stage that occurs after the first stage, the encoder and the decoder being fixed during the second stage; and
    causing presentation of output indicative of the modified data item on the device.

2. The method of claim 1, wherein the adversarial transformation subnetwork is adversarially trained using a discriminator.

3. The method of claim 2, wherein the discriminator is trained at a same time as a generator network via end-to-end backpropagation, the generator network comprising the encoder and the decoder.

4. The method of claim 2, wherein the discriminator receives output data from the decoder.

5. The method of claim 1, wherein the encoder and the decoder are trained in the first stage.

6. The method of claim 1, wherein the adversarial transformation subnetwork is trained using generative adversarial loss.

7. The method of claim 1, wherein the adversarial transformation subnetwork is between the encoder and the decoder.

8. The method of claim 1, further comprising:
    receiving, from a server, the adversarial transformation subnetwork pre-trained to apply the transformation.

9. The method of claim 1, wherein the neural network is a convolutional neural network.

10. The method of claim 1, wherein the neural network is a domain transfer neural network.

11. The method of claim 10, wherein the data item is an image, and wherein the adversarial transformation subnetwork is trained to transfer the image between different domains.

12. The method of claim 11, wherein the domains include at least one of an old person domain, a young person domain, a masculine person domain, a feminine person domain, a frown expression domain, a smile expression domain, a painted domain, or a photorealistic domain.

13. The method of claim 11, further comprising:
    generating the image using an image sensor of the device.

14. The method of claim 10, wherein the data item is an audio item, and wherein the adversarial transformation subnetwork is trained to transfer the audio item between different domains.

15. The method of claim 14, wherein the domains include different musical styles.

16. The method of claim 14, further comprising:
    generating the audio item using a microphone of the device.

17. The method of claim 1, further comprising:
    receiving an instruction to apply the transformation to the data item.

18. The method of claim 17, wherein the instruction to apply the transformation is received from an input interface of the device.

19. A system comprising:
    a memory that stores instructions; and
    one or more processors configured by the instructions to perform operations comprising:
        identifying a data item on a device;
        applying a neural network including an adversarial transformation subnetwork to apply a transformation to the data item to generate a modified data item, the neural network further comprising an encoder and a decoder, the neural network being trained in at least two stages, at least one of the encoder and the decoder being trained in a first stage and the adversarial transformation subnetwork being trained in a second stage that occurs after the first stage, the encoder and the decoder being fixed during the second stage; and
        causing presentation of output indicative of the modified data item on the device.

20. A non-transitory computer-readable storage medium, the computer-readable storage medium including instructions that when executed by at least one processor, cause the at least one processor to perform operations comprising:
    identifying a data item on a device;
    applying a neural network including an adversarial transformation subnetwork to apply a transformation to the data item to generate a modified data item, the neural network further comprising an encoder and a decoder, the neural network being trained in at least two stages, at least one of the encoder and the decoder being trained in a first stage and the adversarial transformation subnetwork being trained in a second stage that occurs after the first stage, the encoder and the decoder being fixed during the second stage; and
    causing presentation of output indicative of the modified data item on the device.

* * * * *